US010431993B2

United States Patent
Huff et al.

(10) Patent No.: US 10,431,993 B2
(45) Date of Patent: Oct. 1, 2019

(54) MODULE MAINTENANCE SYSTEM

(71) Applicant: Artisan Vehicle Systems Inc., Camarillo, CA (US)

(72) Inventors: Brian R. Huff, Newbury Park, CA (US); Mike Kasaba, Malibu, CA (US); Russell Davis, Thousand Oaks, CA (US)

(73) Assignee: Artisan Vehicle Systems Inc., Camarillo, CA (US)

( * ) Notice: Subject to any disclaimer, the term of this patent is extended or adjusted under 35 U.S.C. 154(b) by 0 days.

(21) Appl. No.: 16/113,883

(22) Filed: Aug. 27, 2018

(65) Prior Publication Data

US 2019/0140459 A1 May 9, 2019

Related U.S. Application Data

(60) Division of application No. 14/721,726, filed on May 26, 2015, now Pat. No. 10,063,069, which is a continuation-in-part of application No. 14/494,133, filed on Sep. 23, 2014, now Pat. No. 9,960,396.

(60) Provisional application No. 61/960,715, filed on Sep. 24, 2013, provisional application No. 61/997,186, filed on May 23, 2014.

(51) Int. Cl.
*H02J 7/00* (2006.01)
*H02J 7/14* (2006.01)
*H01M 2/20* (2006.01)
*H01M 2/10* (2006.01)
*H01M 10/42* (2006.01)
*H01M 10/44* (2006.01)

(52) U.S. Cl.
CPC ......... *H02J 7/0019* (2013.01); *H01M 2/1016* (2013.01); *H01M 2/202* (2013.01); *H01M 10/425* (2013.01); *H01M 10/441* (2013.01); *H02J 7/0024* (2013.01); *H01M 2010/4271* (2013.01); *H02J 7/0021* (2013.01); *H02J 7/0042* (2013.01)

(58) Field of Classification Search
USPC ....... 320/134, 136, 135, 119, 115, 107, 108, 320/109, 104
See application file for complete search history.

(56) References Cited

U.S. PATENT DOCUMENTS

| 8,212,571 | B2* | 7/2012 | Emori | H02J 7/0018 324/522 |
|---|---|---|---|---|
| 2008/0050645 | A1* | 2/2008 | Kai | H01M 2/1077 429/61 |
| 2008/0284375 | A1* | 11/2008 | Nagaoka | H02J 7/0016 320/116 |

(Continued)

*Primary Examiner* — Alexis B Pacheco
(74) *Attorney, Agent, or Firm* — Plumsea Law Group, LLC

(57) ABSTRACT

A module maintenance system includes a battery module, a charging device, and a rig. The battery module has a series configuration and a parallel configuration. In the parallel configuration, the rig connects each battery cell of the battery module in parallel and the charging device charges each battery cell of the battery module using the rig. In the series configuration, the battery module serially connects each battery cell of the battery module to a first terminal and a second terminal and the charging device charges each battery cell of the battery module using the first terminal and the second terminal.

20 Claims, 21 Drawing Sheets

(56) References Cited

U.S. PATENT DOCUMENTS

| | | | |
|---|---|---|---|
| 2009/0087722 A1* | 4/2009 | Sakabe | B60L 3/0046 |
| | | | 429/61 |
| 2011/0159350 A1* | 6/2011 | Ochi | H01M 2/1077 |
| | | | 429/159 |
| 2012/0003505 A1* | 1/2012 | Kim | H01M 2/1077 |
| | | | 429/7 |
| 2012/0248870 A1* | 10/2012 | Coleman | H02J 7/345 |
| | | | 307/48 |
| 2014/0035537 A1* | 2/2014 | Hong | B60L 3/0046 |
| | | | 320/162 |
| 2014/0042980 A1* | 2/2014 | Floros | H02J 7/0016 |
| | | | 320/134 |
| 2014/0049222 A1* | 2/2014 | Moorhead | H02J 7/0016 |
| | | | 320/134 |

* cited by examiner

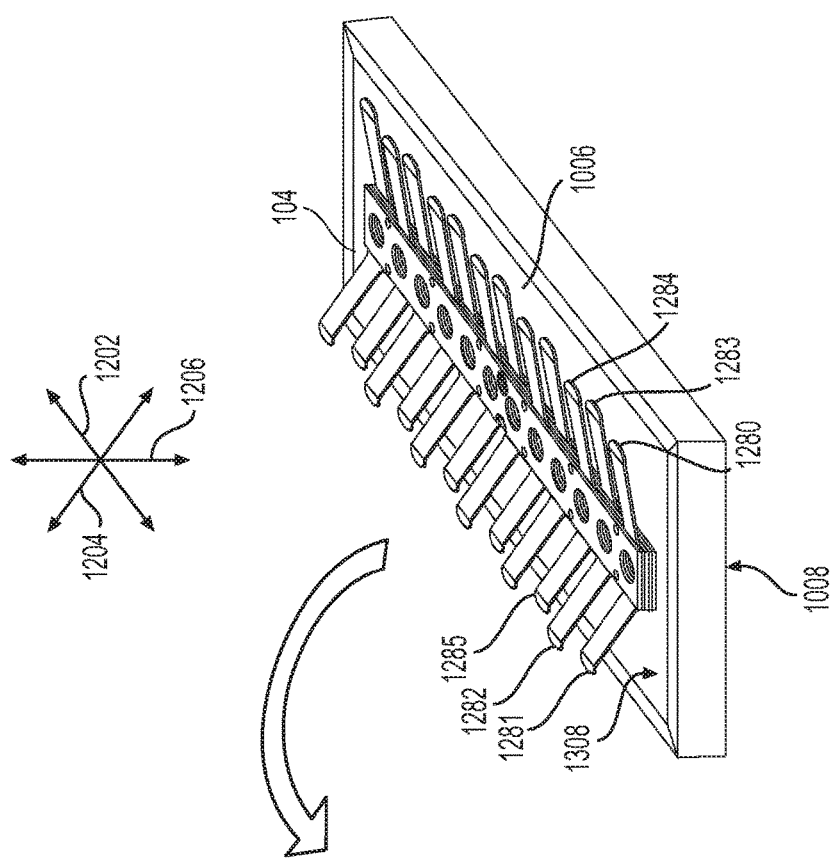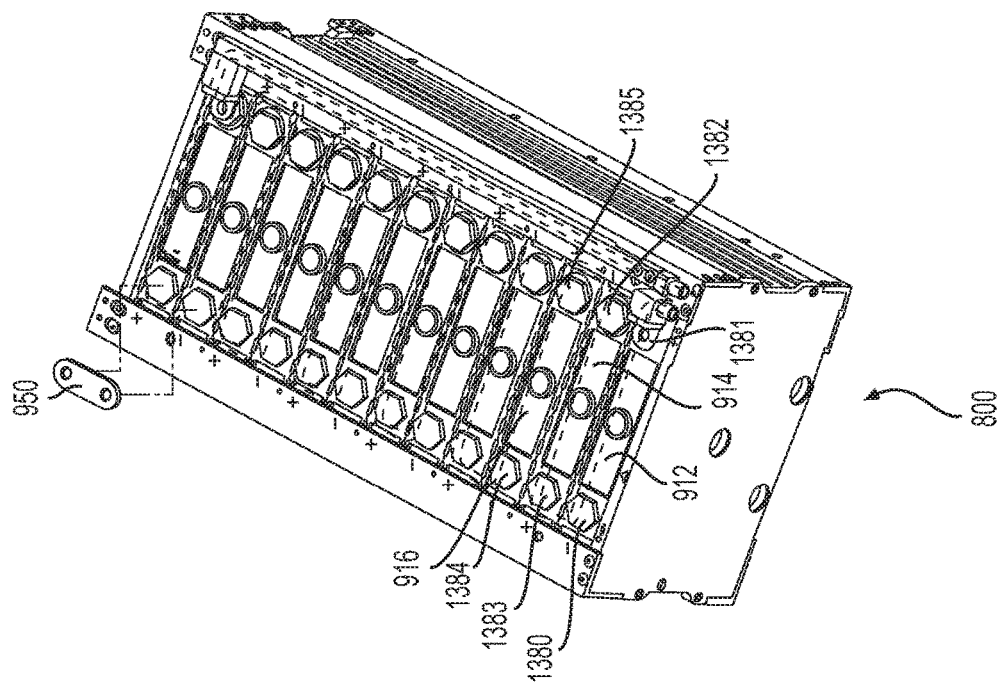
FIG. 13

MODULE MAINTENANCE SYSTEM

CROSS-REFERENCE TO RELATED APPLICATION(S)

This application is a divisional of U.S. Pat. No. 10,063,069, issued Aug. 28, 2018, and titled "Module Maintenance System," which is a continuation-in-part of U.S. Patent Application Publication No. 2015/0086825, published on Mar. 26, 2015, and titled "Module Backbone System," which claims priority to U.S. Provisional Patent Application No. 61/960,715, filed Sep. 24, 2013, and titled "Module Backbone System." Additionally, U.S. Pat. No. 10,063,069 claims priority to U.S. Provisional Application No. 61/997,186, filed on May 23, 2014, and titled "Module Maintenance System." Each patent and application listed above is incorporated herein by reference in its entirety.

BACKGROUND OF THE INVENTION

1. Field of the Invention

The present invention relates to a battery system (e.g., battery pack), particularly a battery system for high voltage applications (e.g., 480 volts).

2. Description of Related Art

Some battery systems may use multiple battery cells. In such systems, battery cells may have different electrical characteristics that may impact a performance of the battery system.

Therefore, there is a need in the art for a battery system that may account for electrical characteristics of a battery cell.

SUMMARY OF THE INVENTION

The proposed invention is directed to a battery system. In some embodiments, the battery system may include a battery module formed of twelve cells, but this technology can use a battery module having any number of battery cells. In one example, a battery module has a nominal voltage of 40 volts (V), 260 ampere-hour (Ah), and 10 kilowatt hour (kWh). In the example, a battery cell of the battery module may have a nominal voltage of 3.33 volts (V). It should be understood that embodiments may use any suitable battery cell types, manufacturers, technologies, and the like.

Embodiments include a battery module, a rig, and a charging device. The battery module includes an enclosure and at least a first battery cell and a second battery cell. The first and second battery cells are disposed in a cavity of the enclosure. The rig includes a lid and a set of buses. The set of buses are attached to the lid. The charging device is for charging the first and second battery cells. The battery module has a series configuration and a parallel configuration. In the series configuration, the lid of the rig is spaced apart from the enclosure and the set of buses of the rig are spaced apart from the first and second battery cells. In the series configuration, one or more bus bars couple the first and second battery cells in series and the charging device modifies charge levels of the first and second battery cells using the one or more bus bars. In the parallel configuration, the lid of the rig attaches to the enclosure of the battery module such that the set of buses of the rig couple to the first and second battery cells and the charging device modifies charge levels of the first and second battery cells using the set of buses.

In one aspect, an apparatus includes a battery module, a rig, and a charging device. The battery module includes at least a first battery cell and a second battery cell. The rig includes a set of buses for connecting with the first and second battery cells. The charging device includes a bulk output and an equalization output. The battery module has a series configuration and a parallel configuration. In the parallel configuration, the rig is disposed onto the battery module such that the set of buses couple the first and second battery cells in parallel. In the parallel configuration, the equalization output is coupled to the set of buses and the charging device outputs a first voltage to the equalization output to equalize charge levels of the first and second battery cells. In the series configuration, one or more bus bars couple the first and second battery cells in series with the bulk output and the charging device outputs a second voltage to the bulk output to modify charge levels of the first and second battery cells. The second voltage is greater than the first voltage.

In another aspect, an apparatus includes a battery module and a rig. The battery module including an enclosure and at least a first battery cell and a second battery cell. The first and second battery cells are disposed in a cavity of the enclosure. The first battery cell includes a first anode and a first cathode and the second battery cell includes a second anode and a second cathode. The rig includes a lid, a first bus having a first set of contact elements, and a second bus having a second set of contact elements. The lid is secured onto the cavity such that the first set of contact elements are coupled to the first anode and the second anode. The lid is secured onto the cavity such that the second set of contact elements are coupled to the first cathode and the second cathode.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 13 is a schematic view of positioning the rig of FIG. 10 on an enclosure of the battery module of FIG. 8, in accordance with an exemplary embodiment;

DETAILED DESCRIPTION

Embodiments may simplify maintenance (e.g., charge, discharge, battery cell balancing, etc.) of a battery module containing a set of battery cells (e.g., 12 battery cells). For example, a module maintenance system may permit bulk charging (e.g., charging the battery cells in series) by connecting a bulk output of a charging device to terminals of a battery module. In the example, a module maintenance system may also permit an equalization of voltages of the battery cells of the battery module by securing a rig onto the battery module and connecting an equalization output of the charging device to the rig.

Figure 1:
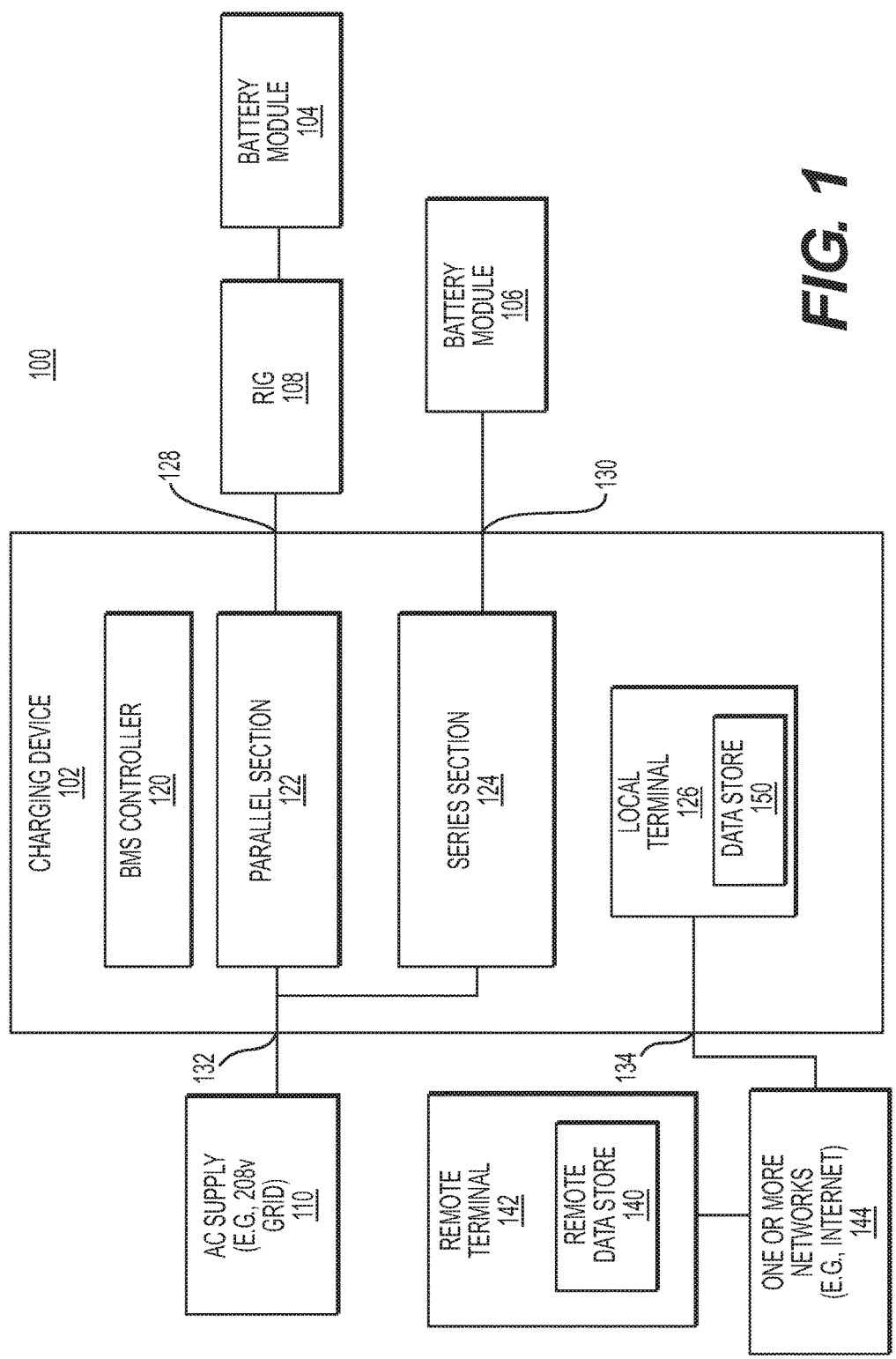
FIG. 1 is a schematic view of a module maintenance system, in accordance with an exemplary embodiment.

A module maintenance system may include any suitable components to facilitate maintenance of battery modules. Referring to FIG. 1, module maintenance system 100 includes charging device 102, battery module 104, battery module 106, and alternating current (AC) supply (e.g., electric grid connection) 110. In other embodiments, a module maintenance system may include different components. For example, in some embodiments, charging device 102 of module maintenance system 100 charges a single battery module (e.g., 104 or 106). In another example, as shown in FIG. 1, module maintenance system 100 may include data port 134 to permit access to one or more networks 144 (e.g., internet), remote terminal 142, and remote data store 140, as described further below.

The AC supply 110 may be any voltage level or current capacity. For example, the AC supply 110 may be a 480/600 volt AC voltage. In another example, the AC supply 110 may be a 277/480 volt AC voltage. In some examples, the AC supply 110 may be a 347/600 volt AC voltage. The AC supply 110 may be part of a commercial grid. For example, the AC supply 110 may include a regional transmission network and be operated at a particular frequency (e.g., 50 Hz, 60 Hz, etc.) The AC supply 110 may use various numbers of phases (e.g., single phase, three phase, etc.).

The battery module may be configured to use any suitable number of battery cells. In some embodiments, a battery module (e.g., 104, 106), etc.) may include two or more battery cells. For example, battery module 104 may include sixteen battery cells, twelve battery cells, eight battery cells, and the like. As used herein, a battery cell may use any suitable battery technology. Examples of a battery cell include capacitors, ultra-capacitors, and electrochemical cells. Examples of electrochemical cells include primary (e.g., single use) and secondary (e.g., rechargeable). Examples of secondary electrochemical cells include lead-acid, valve regulated lead-acid (VRLA), gel, absorbed glass mat (AGM), nickel-cadmium (NiCd), nickel-zinc (NiZn), nickel metal hydride (NiMH), lithium-ion (Li-ion), and the like. A battery cell may have various voltage levels. For example, a battery cell of battery module 104 may have a voltage of less than 40 volts, less than 20 volts, less than 10 volts, less than 5 volts, 3.3 volts, less than 3.3 volts, and the like. Similarly, the battery cell may have various energy capacity levels. For example, a battery cell of battery module 104 may have a capacity of more than 13 ampere-hour, more than 10 ampere-hour, more than 20 ampere-hour, more than 25 ampere-hour, and the like.

The charging device 102 may include any suitable components to facilitate a maintenance of a battery module (e.g., 104, 106, etc.). Referring to FIG. 1, charging device 102 may include battery maintenance system (BMS) controller 120, parallel section 122, series section 124, and local terminal 126 (e.g., computing device). In other embodiments, charging device 102 may be different. For example, local terminal 126 may be omitted.

In those instances where a local terminal is included, any suitable technology may be used. As used herein, a terminal may include to computing resources of a single computer, a portion of the computing resources of a single computer, and/or two or more computers in communication with one another. For example, local terminal 126 may be a single computer (desktop, laptop, notebook, etc.), server, mobile device (e.g., tablet, smart phone, etc.), and the like. In some embodiments, any of these resources may be operated by one or more human users. In some embodiments, a terminal may also include one or more storage devices including, but not limited to, magnetic, optical, magneto-optical, and/or memory, including volatile memory and non-volatile memory. For example, local terminal 126 may include a solid state drive and non-volatile memory.

In some embodiments, the local terminal may be configured to determine electrical characteristics of one or more battery cells of a battery module. In some embodiments, the local terminal may measure a charge and/or discharge rate of battery module. In some embodiments, the local terminal may utilize one or more sensor circuits. An example of a sensor circuit may include one or more features described in Kasaba et al., U.S. patent application Ser. No. 14/529,853, filed on Oct. 31, 2014, and titled "System and Method for Battery Pack Charging and Remote Access," the entirety of which is incorporated herein by reference. For example, a sensor circuit may include a voltage sensor and/or a current sensor. In the example, local terminal 126 may facilitate measurement and recording of a discharge rate and/or a charge rate of a battery cell of battery module 104 and/or battery module 106 using such a sensor circuit. Moreover, in the example, local terminal 126 may store data related to the measurements and/or rates in data store 150 and/or transmit the data related to the measurements and/or rates to remote data store 140 using one or more networks 144. In some embodiments, the controller may modify a charging and/or discharging rate of a battery cell of battery module to determine electrical characteristics of the battery cell. For example, controller 120 may rapidly charge and/or discharge battery cell 912 to facilitate the testing of electrical characteristics of battery cell 912 as well as battery module 800.

The battery maintenance controller 120 may include one or more processors and have access to memory including instructions to operate charging device 102. For example, controller 120 may be configured to interact with local terminal 126 to transmit a log of data store 150. In another example, controller 120 may be configured to receive control instructions and to transmit the control instructions to parallel section 122 and/or series section 124.

The one or more networks 144 may include any number of devices and may use various protocols. In some embodiments, one or more networks 144 may include a connection to an internet service provider and utilize an internet protocol suite (e.g., TCP/IP). As shown in FIG. 1, charging device 102 may include data port 134 to connect the charging device 102 with remote terminal 142 and/or the remote data store 140 using the one or more networks 144.

In some embodiments, the charging device may charge battery modules using electrical power received from an electric grid. Referring to FIG. 1, input connection 132 electronically couples charging device 102 to AC supply 110. As used herein, electronically couple may refer to any electronically conductive connection. In the example, charging device 102 converts the AC power received from the AC supply 110 to charge battery module 106 and/or battery module 104. In some embodiments, the charging device may discharge battery modules onto an electric grid, as described further below. In other embodiments, the charging device may discharge one or more battery cells of a battery module to charge one or more other battery cells of the battery module or one or more battery cells of another battery module (not shown).

In some embodiments, the charging device may maintain a charge level (e.g., charge and/or discharge) of a battery module using a bulk output. Referring to FIG. 1, bulk output 130 may electronically couple series section 124 of charging device 102 to one or more battery cells of battery module 106. In some embodiments, the charging device may maintain a charge level (e.g., charge and/or discharge) of a battery module using an equalization connector. Referring to FIG. 1, equalization output 128 may electronically couple parallel section 122 of charging device 102 to one or more battery cells of battery module 104.

Figure 2:
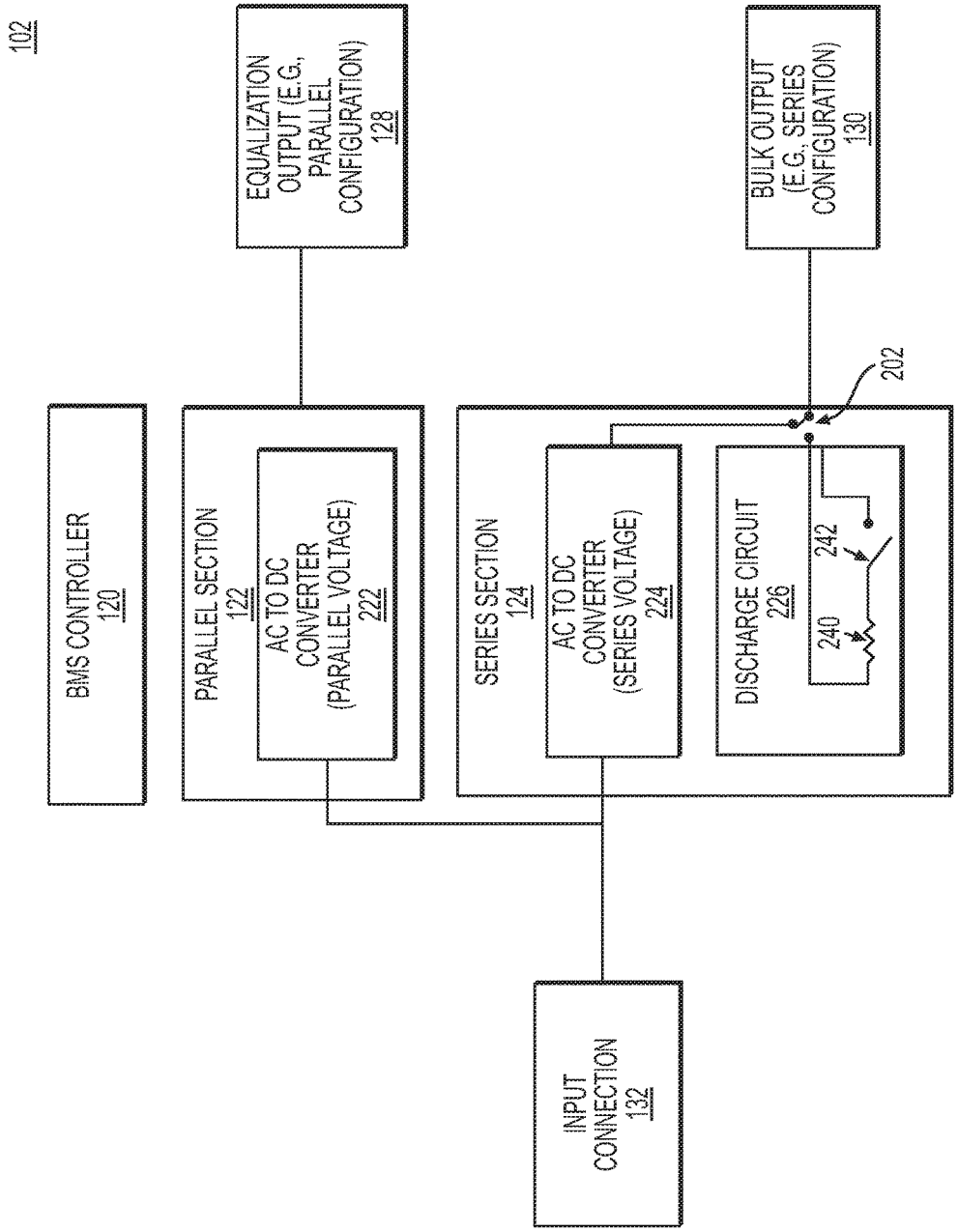
FIG. 2 is a schematic view of a charging device, in accordance with an exemplary embodiment.

In some embodiments the parallel section of a charging device may include a first converter for charging battery cells in parallel. Referring to FIG. 2, first converter 222 may receive power from an AC system associated with AC supply 110 (see FIG. 1). For example, first converter 222 may support various voltages, currents, power levels, frequencies (e.g., 50 Hz, 60 Hz), number of phases, and the like. In the example, first converter 222 may support a 480/600 volt AC voltage. In some instances, a transformer (not shown) may be used to adjust an input voltage to account for regional differences. For example, a first transformer is used for a 480/600 volt AC voltage for input into first converter 222 and a second transformer is used for a 347/600 volt AC voltage for input into first converter 222. As such, first converter 222 may support various AC voltages without impacting conversion between the AC and DC systems.

Similarly, the first converter may support various DC systems. For example, first converter 222 may support a DC system associated with one or more battery cells of battery module 104 and/or one or more battery cells of battery module 106. In some embodiments, first converter 222 may output a voltage (e.g., operating voltage, nominal voltage, etc.) of a battery cell. For example, each battery cell of battery module 104 may have a nominal voltage of 3.3 volts. In the example, first converter 222 may output 3.3 volts at equalization output 128. In other examples, first converter 222 may output other voltages.

The first converter may use various types of converter topologies including, for example, buck, boost, buck-boost, and the like. Similarly, the first converter may use various types of inverter topologies including, for example, a grid-tie inverter system, a square wave, modified square wave, modified sine wave, pure sine wave, and the like. The topologies used in the first converter may support a bi-directional function. As used herein, a bi-directional DC/AC converter may include a converter configured to (1) convert from the DC system to the AC system and (2) convert from the AC system to the DC system. In some embodiments, the first converter may include an AC to DC converter for converting from the AC system to the DC system and a DC to AC inverter for converting from the DC system to the AC system. In other embodiments, a single converter is used to convert between the AC and the DC systems.

In some embodiments the series section of a charging device may include a second converter for charging battery cells in series. Referring to FIG. 2, series section 124 may include second converter 224. In some embodiments, second converter 224 is substantially similar to first converter 222 except that the first converter and second converter 224 output different voltages. In some embodiments, first converter 222 may output a charge voltage (e.g., operating voltage, nominal voltage, etc.) of a battery cell of a battery module (e.g., 104) and second converter 224 may output a charge voltage (e.g., operating voltage, nominal voltage, etc.) of series string of battery cells of a battery module (e.g., 104). For example, each of the twelve battery cells of battery module 104 may be connected in series and each of the twelve battery cells of battery module 104 may have a nominal voltage of 3.3 volts, thereby resulting in battery module 104 having a nominal voltage of about 40 volts. In the example, first converter 222 may output 3.3 volts at equalization output 128 while second converter may output 40 volts at bulk output 130.

In those instances where the first converter and/or the second converter utilize a switching topology, any suitable switching control may be used to facilitate a selection of voltages output on the bulk output and/or equalization output. In some embodiments, controller 120 may selectively switch the first converter of the parallel section and/or the second converter of the series section to suitable voltage levels. For example, controller 120 may be programmed by a human user to switch first converter 222 to output a first voltage on equalization output 128 and to switch second converter 224 to output a second voltage on bulk output 130. In the example, the first voltage (e.g., 3.3 volts) may be less than the second voltage (e.g., 39.6 volts).

In some embodiments, the series section may include a discharge circuit. In some embodiments, the discharge circuit may include a resistive element, such as a fixed or variable resistor (e.g., wire wound, grid resistor, etc.), and a switch, such as a transistor (metal-oxide-semiconductor field-effect transistor, bipolar junction transistor, insulated-gate bipolar transistor, etc.). Referring to FIG. 2, discharge circuit 226 may include resistive element 240 and switch 242. In some embodiments, the discharge circuit may selectively switch two or more resistors to permit different discharge rates (not shown). In some embodiments, switch 242 is periodically closed and opened to permit different discharge rates. Referring to FIG. 2, controller 120 may selectively open and close switch 242 using pulse width modulation. For example, a duty cycle (e.g., proportion of a time closed) of switch 242 may be increased to permit a faster discharge rate or may be decreased to permit a slower discharge rate.

In some embodiments, the charging device may selectively switch between the discharge circuit and the second converter. In some embodiments, the controller may selectively switch between the charging and discharging states using a switch (e.g., transistor, electromagnetic relay, etc.). As shown in FIG. 2, switch 202 may be a single pole change over switch configured for electronically coupling bulk output 130 to either second converter 224 or discharge circuit 226. In other embodiments, other types of switches (e.g., double pole change over) may be used.

Figure 3:
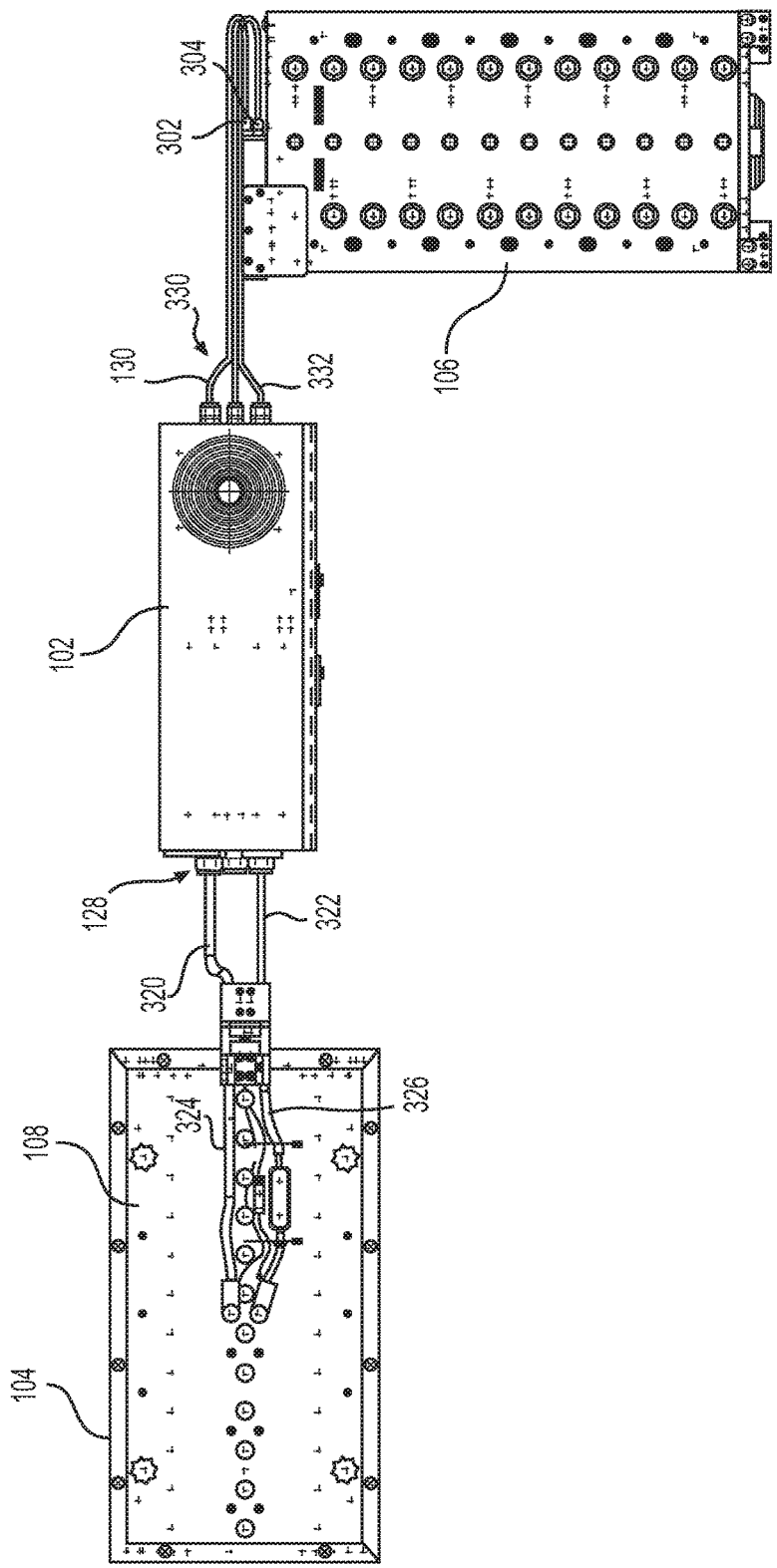
FIG. 3 is a schematic view of a module maintenance system in a first arrangement, in accordance with an exemplary embodiment.
Figure 4:
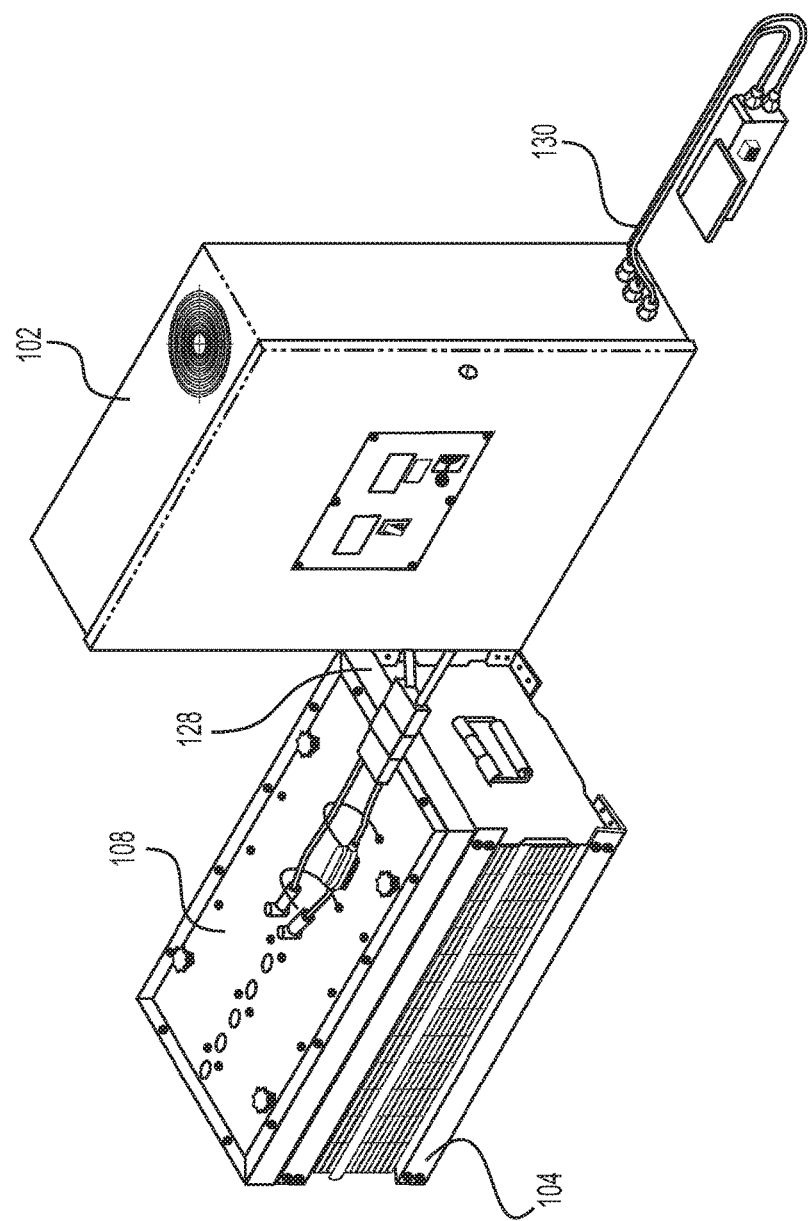
FIG. 4 is a schematic view of a module maintenance system in a second arrangement, in accordance with an exemplary embodiment.

In some embodiments, the charging device may simultaneously have an equalization output electronically coupled to a first battery module and a bulk output electronically coupled to a second battery module. Referring to FIG. 3, charging device 102 may be electronically coupled to battery module 104 by equalization output 128 and rig 108. As used herein, a rig may refer to a lid having a set of buses for connecting battery cells of a battery module in parallel, as discussed further with respect to FIGS. 10-16. In the example, first connector 320 (e.g., positive polarity) and second connector 322 (e.g., negative polarity) of equalization output 128 of charging device 102 may be electronically coupled to first connector 324 and second connector 326 of rig 108 for battery module 104. Similarly, first connector 330 (e.g., positive polarity) and second connector 332 (e.g., negative polarity) of bulk output 130 of charging device 102 may be electronically coupled to first terminal 302 and second terminal 304 of battery module 106. In other embodiments, the charging device may have an equalization output electronically coupled to a first battery module and a bulk output electronically uncoupled or disconnected. Referring to FIG. 4, charging device 102 may be electronically coupled to battery module 104 by equalization output 128 and rig 108. In the example bulk output 130 may be electronically isolated from battery module 104 and battery module 106.

Figure 5:
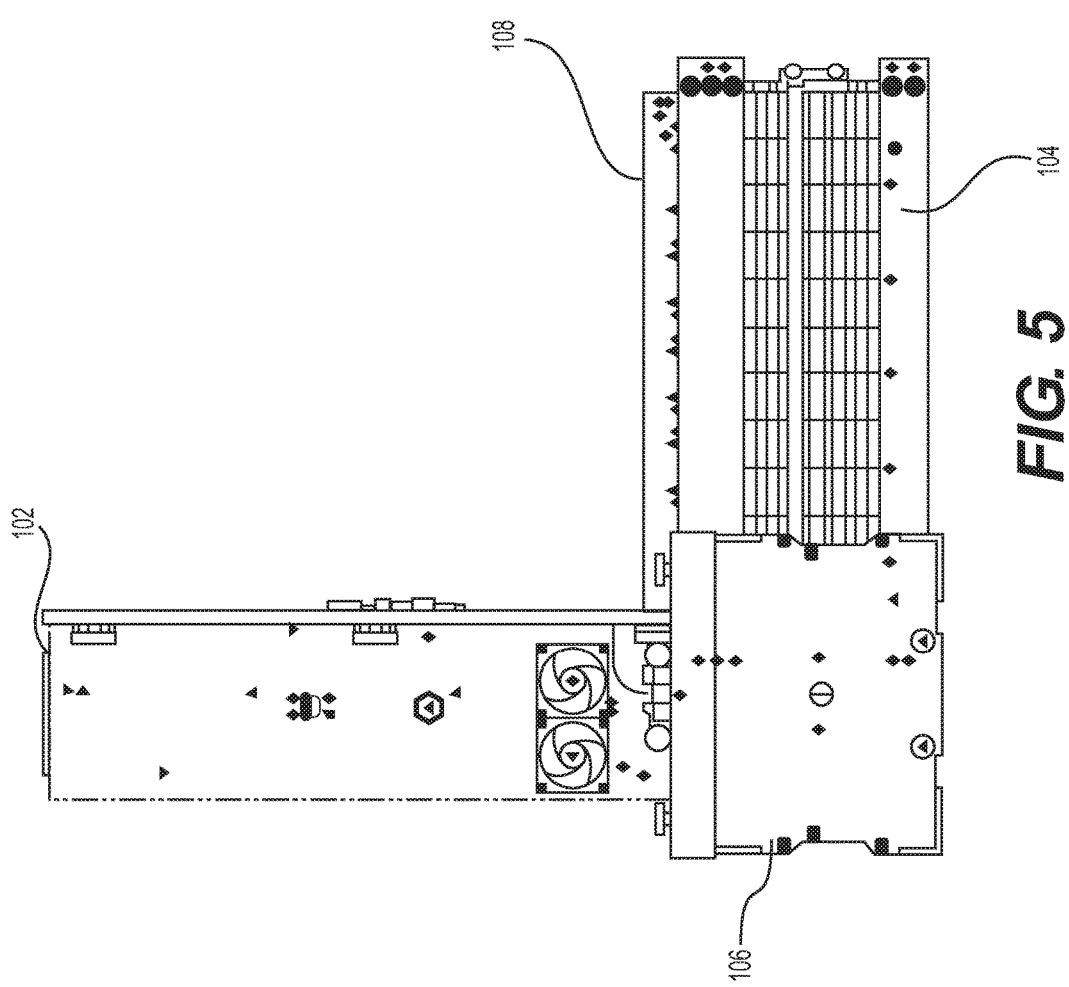
FIG. 5 is a schematic view of a module maintenance system in a third arrangement, in accordance with an exemplary embodiment.
Figure 6:
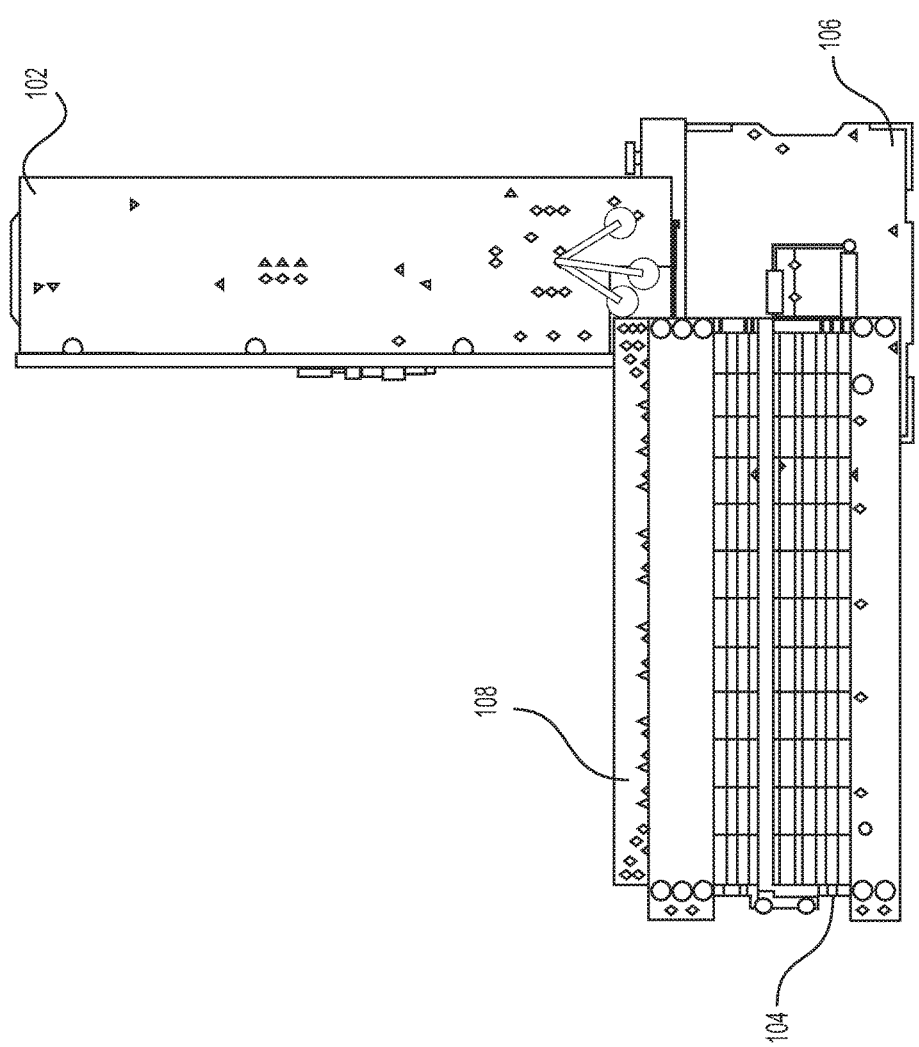
FIG. 6 is a schematic view of a module maintenance system in a fourth arrangement, in accordance with an exemplary embodiment.
Figure 7:
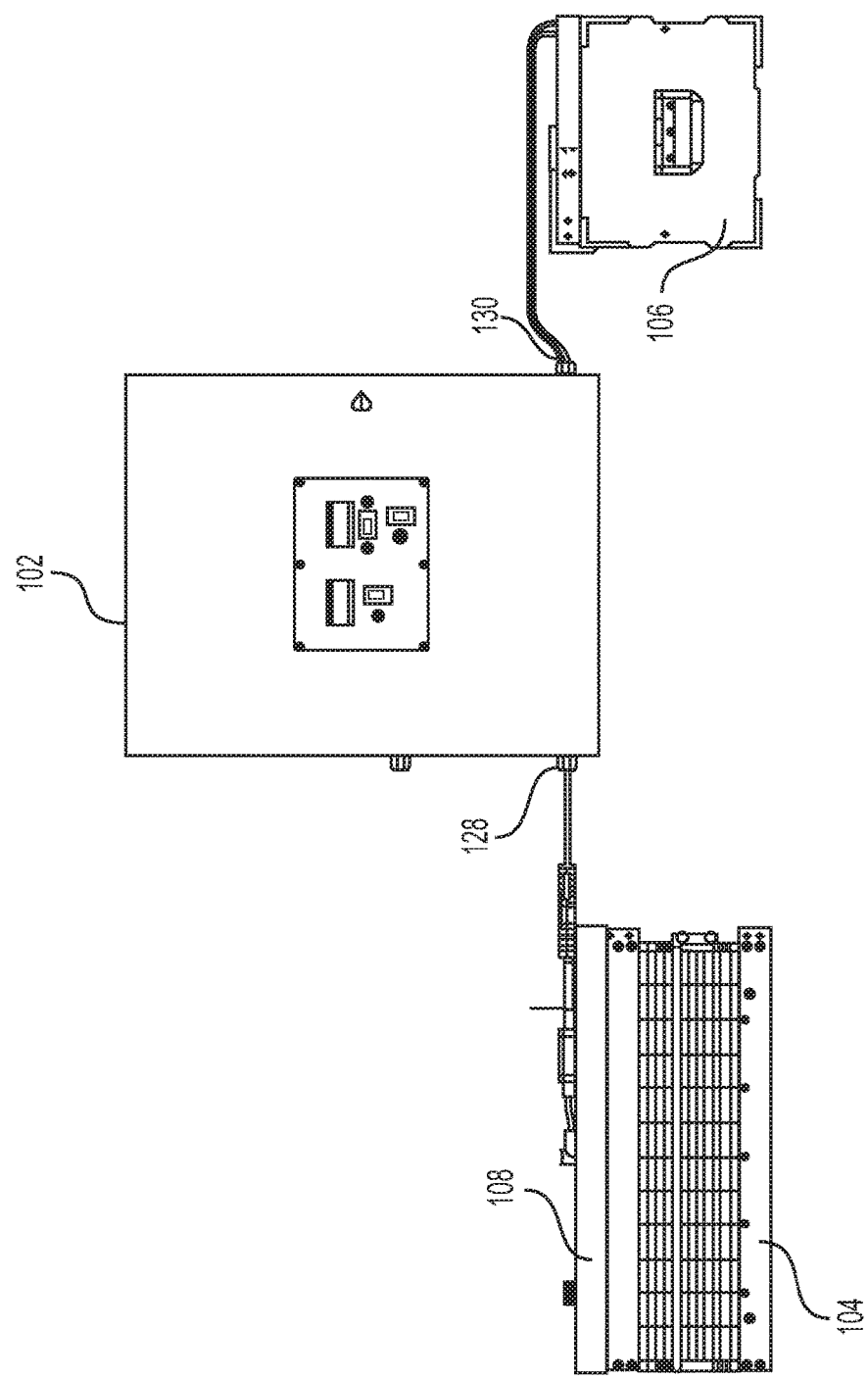
FIG. 7 is a schematic view of a module maintenance system in a fifth arrangement, in accordance with an exemplary embodiment.

In some embodiments, the charging device may be portable to permit use in remote locations. In some embodiments, the charging station may be disposed in close proximity with a battery module. Referring to FIGS. 5-6, charging device 102 may be stacked onto battery module 106. In the example, battery module 104 may be placed adjacent to battery module 106, for example, to reduce a footprint of the battery module system. In other embodiments, the charging station may be spaced apart from a battery module. Referring to FIG. 7, charging device 102 may be spaced apart from battery modules 104 and 106. In the example, battery module 104 may be electronically coupled to equalization output 128 using rig 108 and battery module 106 may be electronically coupled to bulk output 130. In other examples, battery module 104 may be electronically decoupled from equalization output 128 (not shown) or battery module 106 may be electronically decoupled from bulk output 130 (not shown).

Figure 8:
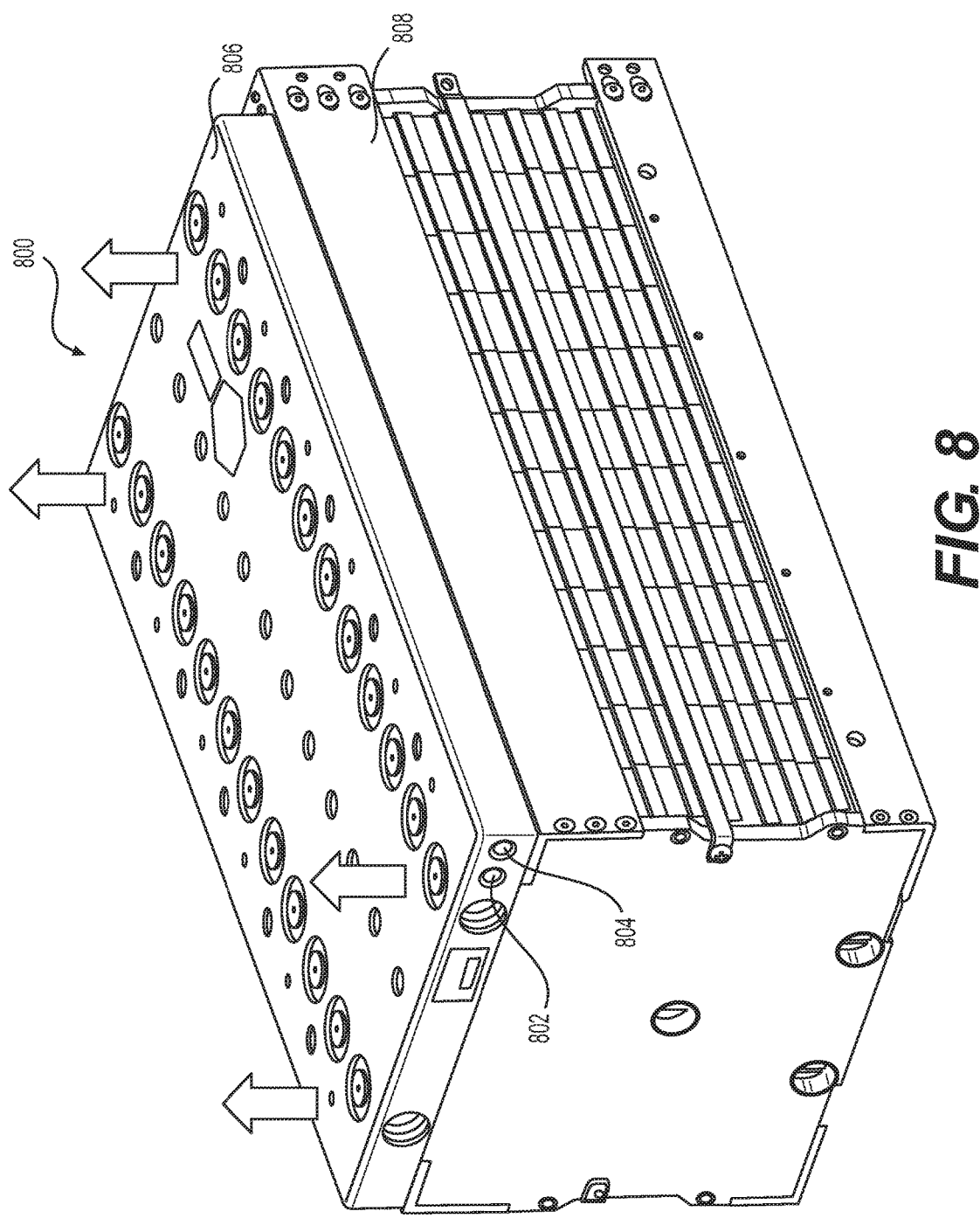
FIG. 8 is a schematic view of a battery module, in accordance with an exemplary embodiment.
Figure 9:
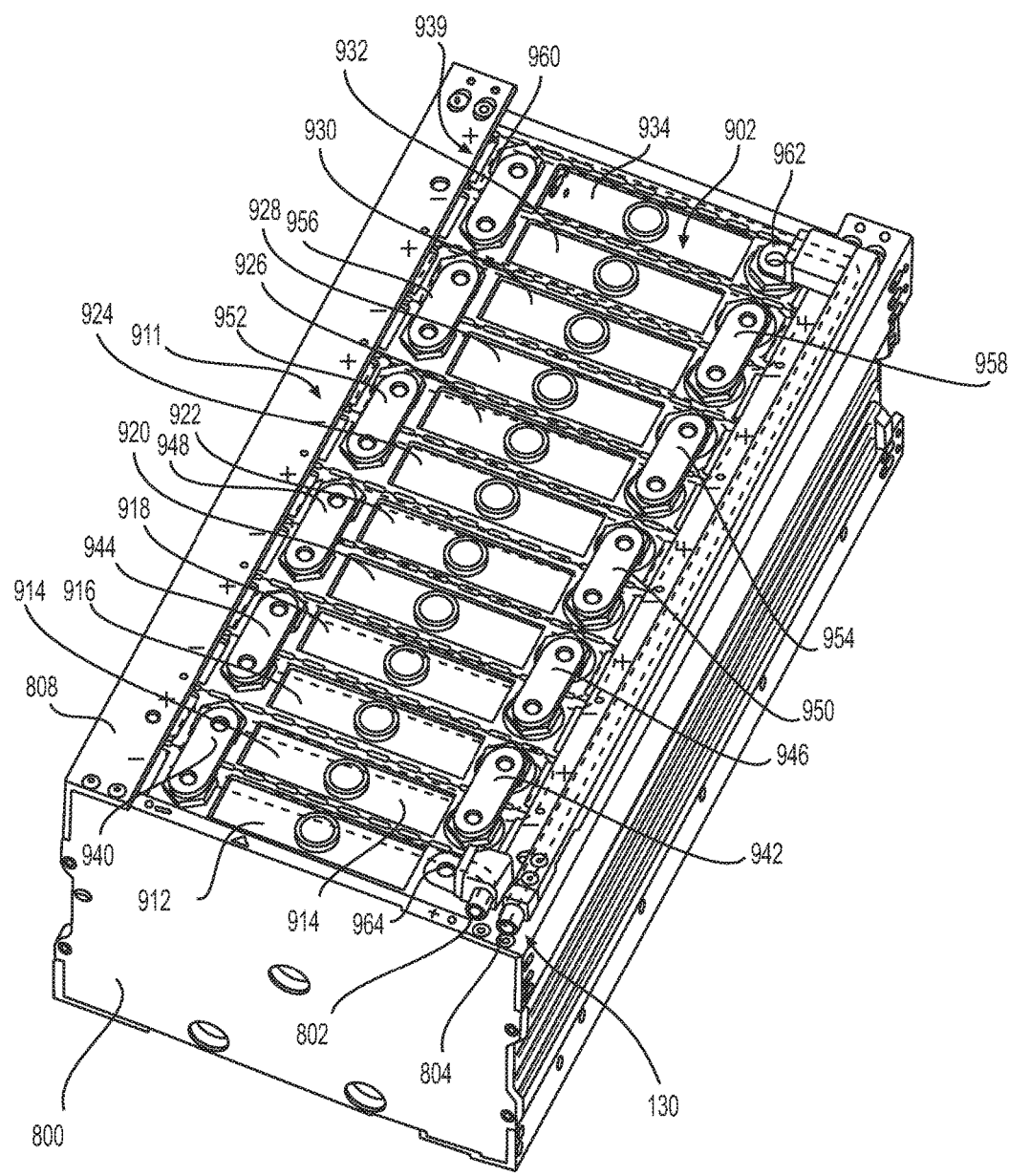
FIG. 9 is a schematic view of bus bars connecting battery cells of the battery module of FIG. 8, in accordance with an exemplary embodiment.

In some embodiments, a panel of a battery module may be removed from an enclosure of the battery module to permit attachment of a rig. Referring to FIG. 8, battery module 800 may be substantially similar to battery module 104 and battery module 106. For example, battery module 800 may include twelve battery cells connected in series to a first terminal 802 and a second terminal 804. As shown in FIGS. 8 and 9, removal of panel 806 from enclosure 808 may expose cavity 902 of enclosure 808.

In some embodiments, a set of bus bars electronically couple battery cells of a battery module in series with terminals of the battery module to permit discharging and charging of the battery cells. Referring to FIG. 9, battery module 800 may have set of battery cells 911 that includes battery cells 912-934. In the example, set of battery cells 911 may be electronically coupled by set if bus bars 939. In other examples, set of battery cells 911 may include different numbers of battery cells. In the example, set of bus bars 939 may include bus bars 940-964. In the example, bus bar 940 connects an anode of battery cell 912 to a cathode of battery cell 914, bus bar 942 connects an anode of battery cell 914 to a cathode of battery cell 916, bus bar 944 connects an anode of battery cell 916 to a cathode of battery cell 918, bus bar 946 connects an anode of battery cell 918 to a cathode of battery cell 920, bus bar 948 connects an anode of battery cell 920 to a cathode of battery cell 922, bus bar 950 connects an anode of battery cell 922 to a cathode of battery cell 924, bus bar 952 connects an anode of battery cell 924 to a cathode of battery cell 926, bus bar 954 connects an anode of battery cell 926 to a cathode of battery cell 928, bus bar 956 connects an anode of battery cell 928 to a cathode of battery cell 930, bus bar 958 connects an anode of battery cell 930 to a cathode of battery cell 932, and bus bar 960 connects an anode of battery cell 932 to a cathode of battery cell 934. In the example, bus bar 962 may electronically couple a cathode of battery cell 912 to first terminal 802 and bus bar 964 may electronically couple an anode of battery cell 934 to second terminal 804.

Figure 10:
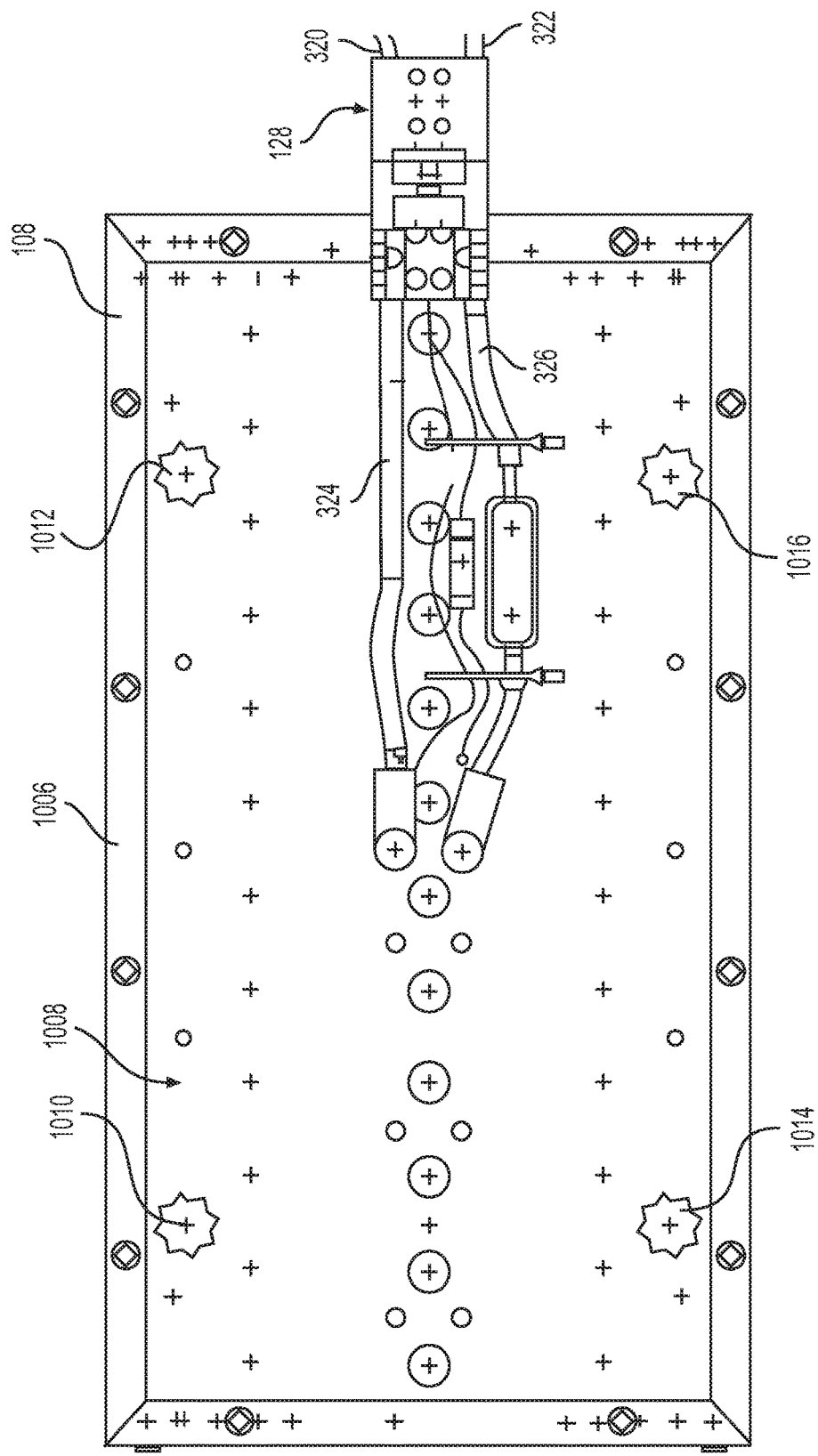
FIG. 10 is a schematic view of a rig for connecting battery cells of the battery module of FIG. 8, in accordance with an exemplary embodiment.

In some embodiments, a battery module system may include a rig for equalizing a battery cell charge of battery cells disposed in a battery module. Some embodiments may include any suitable number of hand screws to attach the rig to an enclosure of a battery module. Referring to FIG. 10, rig 108 may include hand screws 1010-1016 to permit a human user to secure rig 108 onto a battery module (e.g., 104, 800, etc.). In some embodiments, hand screws are disposed on top surface 1008 of lid 1006. In the example, top surface 1008 of lid 1006 may include first connector 324 (e.g., positive polarity) and second connector 326 (e.g., negative polarity) of rig 108 for connection with first connector 320 (e.g., positive polarity) and second connector 322 (e.g., negative polarity) of equalization output 128.

Figure 11:
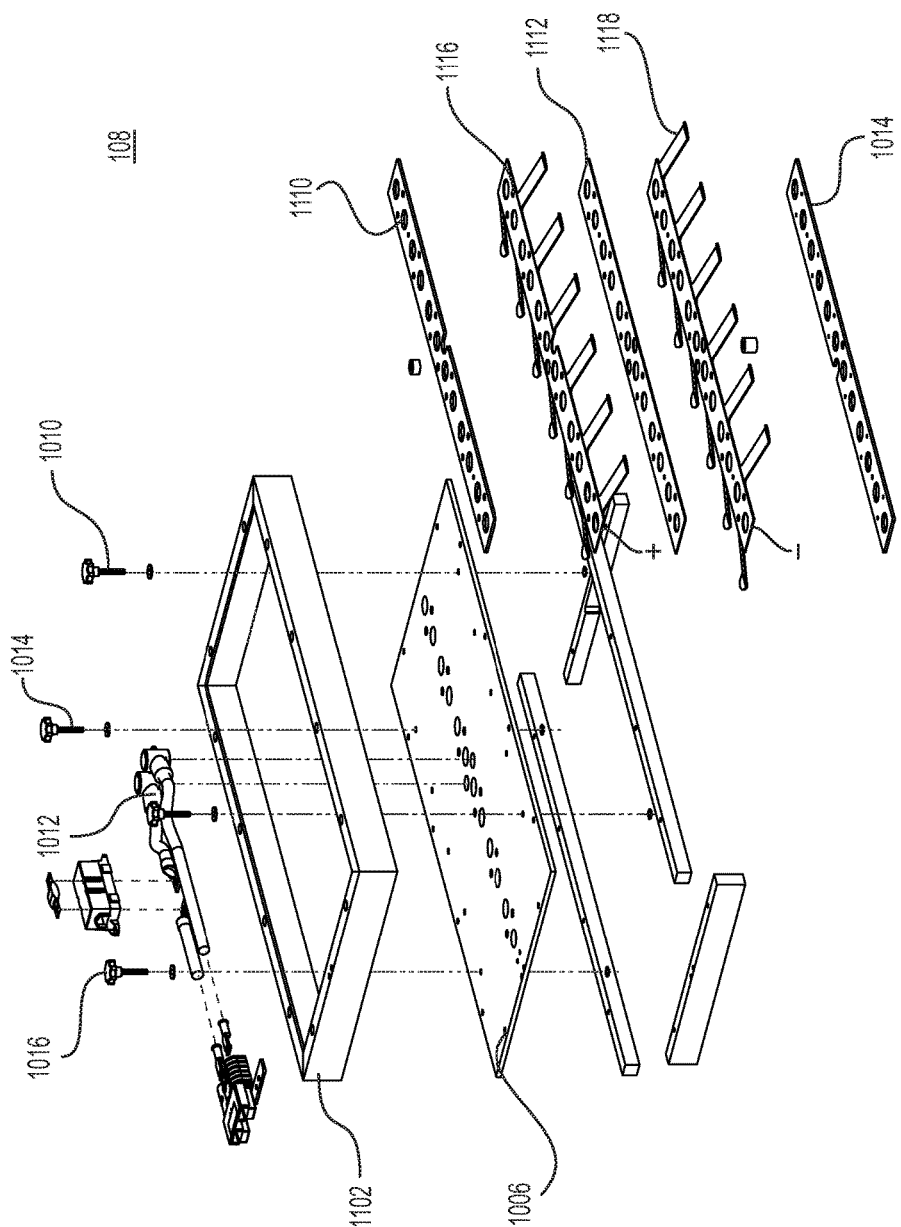
FIG. 11 is an exploded view of the rig of FIG. 10, in accordance with an exemplary embodiment.

In some embodiments, the rig may include a set of buses for electronically coupling with battery cells of a battery module. As used herein, a bus may be formed of any material suitable for conducting electrical current, for example, copper, aluminum, and the like. Referring to FIG. 11, rig 108 may include first bus 1116 and second bus 1118. It should be understood that although FIG. 11 depicts first bus 1116 as associated with a positive '+' polarity and depicts second bus 1118 as associated with a negative '−' polarity, the polarity associated with the set of buses may be different. For example, first bus 1116 may be associated with a negative '−' polarity and second bus 1118 may be associated with a positive '+' polarity (not shown).

In some embodiments, bus bars of the rig may be insulated by one or more insulation layers. As used herein, an insulation layer may be formed of any dielectric material suitable for resisting a flow of electrical current, for example, fiberglass, porcelain, plastics, parylene, and the like. Referring to FIG. 11, insulating layer 1112 may be disposed between first bus 1116 and second bus 1118. In the example, insulating layer 1110 may be disposed on one side of first bus 1116 and insulating layer 1112 may be disposed on the other side of first bus 1116. Similar, in the example, insulating layer 1114 may be disposed on one side of second bus 1118 and insulating layer 1112 may be disposed on the other side of second bus 1118.

In some embodiments, the rig may include an edging to permit the lid of the rig to seal a cavity of a battery module. Referring to FIG. 11, rig 108 may include edging 1102 that attaches to the lid 1006. In the example, rig 108 may be disposed onto a battery module by a human user to seal a battery module (see FIG. 16), thereby preventing dust and dirt from entering into the battery module.

Figure 12:
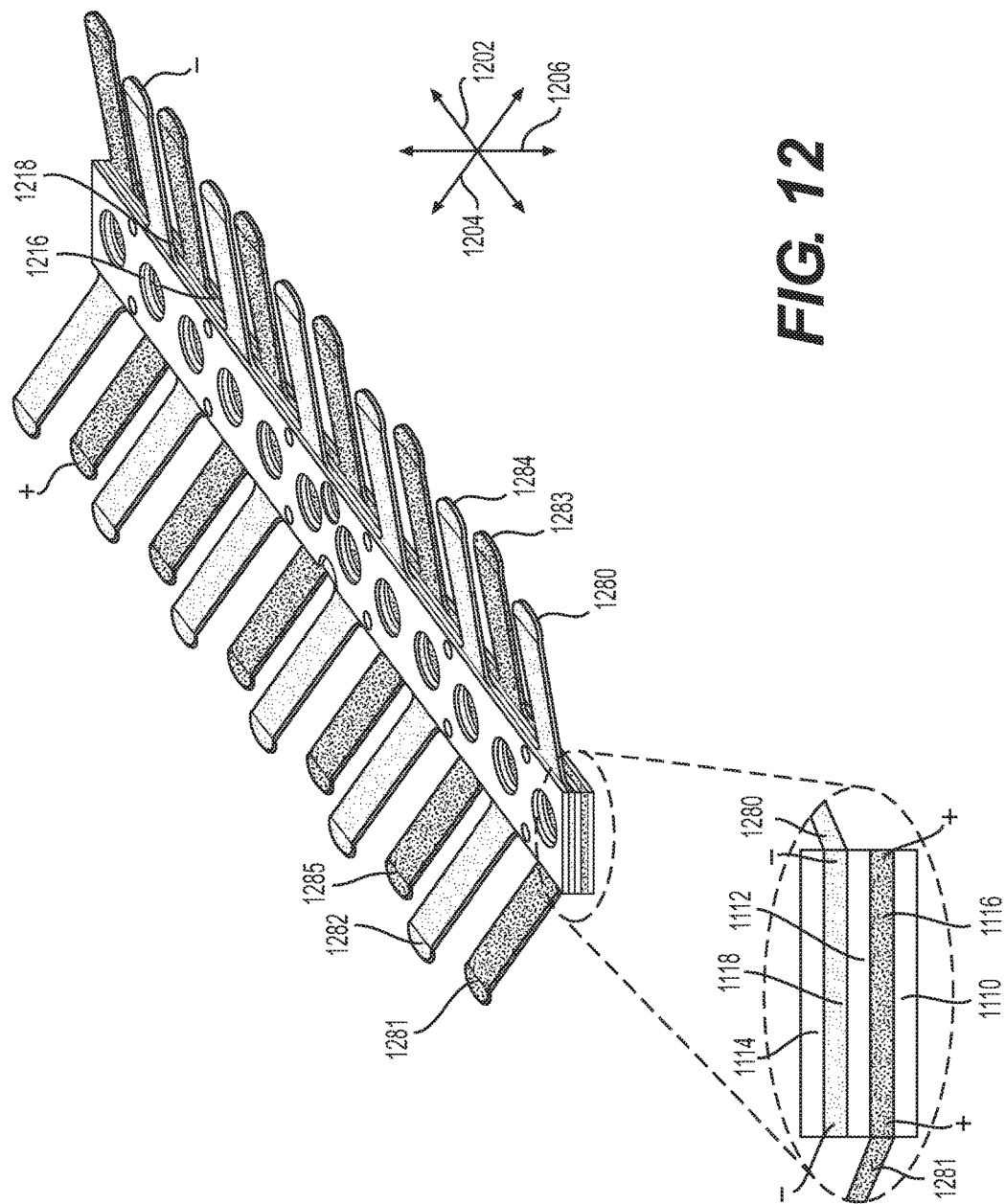
FIG. 12 is a schematic view of contact elements of the rig of FIG. 10, in accordance with an exemplary embodiment.

In some embodiments, the set of busses of the rig may include contact elements to electronically couple to battery cells of a battery module. Referring to FIG. 12, first bus 1116 may include contact element 1281 for a cathode of a first battery cell (e.g., 912), contact element 1283 for a cathode of a second battery cell (e.g., 914), and contact element 1285 for a cathode of a third battery cell (e.g., 916). As shown, contact element 1281 of first bus 1116 may be representative of other contact elements of first bus 1116. For example, contact element 1281 may have a shape, thickness, material, and the like of contact elements 1283 and 1285, as well as other contact elements of first bus 1116. It should be understood that the first bus may include any suitable number of contact elements. In some embodiments, first bus 1116 may include a contact element for each battery cell of a battery module.

Similarly, second bus 1118 may include contact element 1280 for an anode of a first battery cell (e.g., 912), contact element 1282 for an anode of a second battery cell (e.g., 914), and contact element 1284 for an anode of a third battery cell (e.g., 916). As shown, contact element 1280 of second bus 1118 may be representative of other contact elements of second bus 1118. For example, contact element 1280 may have a shape, thickness, material, and the like of contact elements 1282 and 1284, as well as other contact elements of second bus 1118. It should be understood that the second bus may include any suitable number of contact elements. In some embodiments, second bus 1118 may include a contact element for each battery cell of a battery module.

In some embodiments, an elongated portion of the first bus and/or the second bus may extend along a first axis. Referring to FIG. 12, elongated portion 1216 of first bus 1116 and elongated portion 1218 of second bus 1118 extend in one or more directions parallel to first axis 1202. In some embodiments, contact elements of the first bus and/or the second bus may extend in one or more directions parallel to second axis 1204. In the example, first axis 1202 and second axis 1204 are perpendicular. Referring to FIG. 12, contact element 1281 of first bus 1116 may extend away from elongated portion 1216 of first bus 1116 in a direction parallel to second axis 1204. Similarly, in the example, contact element 1282 of second bus 1118 may extend away from elongated portion 1218 of second bus 1118 in a direction parallel to second axis 1204. As shown, in some embodiments, contact elements of the first bus and/or the second bus may extend in different directions along the second axis. Referring to FIG. 12, contact element 1281 of first bus 1116 extends along one direction of second axis 1204 (e.g., left) while contact element 1283 of first bus 1116 extends along the other direction of second axis 1204 (e.g., right). Similarly, contact element 1280 of second bus 1118 extends along one direction of second axis 1204 (e.g., right) while contact element 1282 of second bus 1118 extends along the other direction of second axis 1204 (e.g., left).

In some embodiments, the buses of the rig may be stacked. Referring to FIG. 12, first bus 1116 and second bus 1118 are stacked in a direction along third axis 1206, which may be perpendicular to first axis 1202 and second axis 1204. In some embodiments, the buses are stacked with insulating layers. Referring to FIG. 12, first bus 1116, second bus 1118, and insulating layers 1110-114 are stacked along third axis 1206.

In some embodiments, contact elements of a bus of the rig are interwoven with contact elements of another bus of the rig to permit a coupling of battery cells disposed in a battery module to have alternating cathode and anode connections to facilitate a series connection. Referring to FIG. 12, contact element 1282 of second bus 1118 is disposed between contact elements 1281 and 1285 of first bus 1116. Similarly, contact element 1283 of first bus 1116 is disposed between contact elements 1280 and 1284 of second bus 1118.

In some embodiments, anodes and cathodes of battery cells of a battery module may be alternating to facilitate electronically coupling the battery cells in series. Referring to FIG. 13, first anode 1380 of battery cell 912 is spaced closer to second cathode 1383 of battery cell 914 than second anode 1382 of battery cell 914. In the example, first cathode 1381 of battery cell 912 is spaced closer to second anode 1382 of battery cell 914 than second cathode 1383 of battery cell 914. Similarly, as shown in FIG. 13, second anode 1382 of battery cell 914 is spaced closer to third cathode 1385 of battery cell 916 than third anode 1384 of battery cell 916. In the example, second cathode 1383 of battery cell 914 is spaced closer to third anode 1384 of battery cell 916 than third cathode 1385.

In some embodiments, battery cells of a battery module may be aligned in the battery module to facilitate electrical coupling of the battery cells. In some embodiments, a cathode of a first battery, an anode of a second battery, and a cathode of a third battery are aligned. Referring to FIG. 13, first anode 1380 of battery cell 912, second cathode 1383 of battery cell 914, and third anode 1384 of battery cell 916 are aligned along first axis 1202. In the example, first cathode 1381 of battery cell 912, second anode 1382 of battery cell 914, and third cathode 1385 of battery cell 916 are aligned along first axis 1202. In some embodiments, a cathode and an anode of a battery cell are aligned. Referring to FIG. 13, first anode 1380 of battery cell 912 and first cathode 1381 are aligned along second axis 1204. In the example, second anode 1382 of battery cell 914 and second cathode 1383 are aligned along second axis 1204. In the example, third anode 1384 of battery cell 916 and third cathode 1385 are aligned along second axis 1204.

Figure 14:
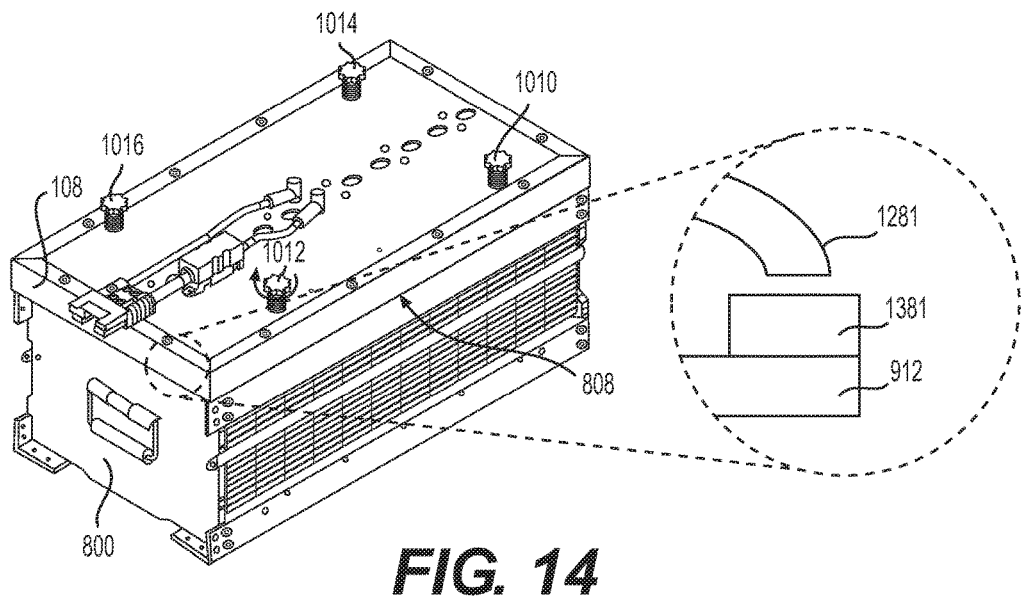
FIG. 14 is a schematic view of coupling contact elements of the rig of FIG. 10 to bus bars of the battery module of FIG. 8, in accordance with an exemplary embodiment.
Figure 15:
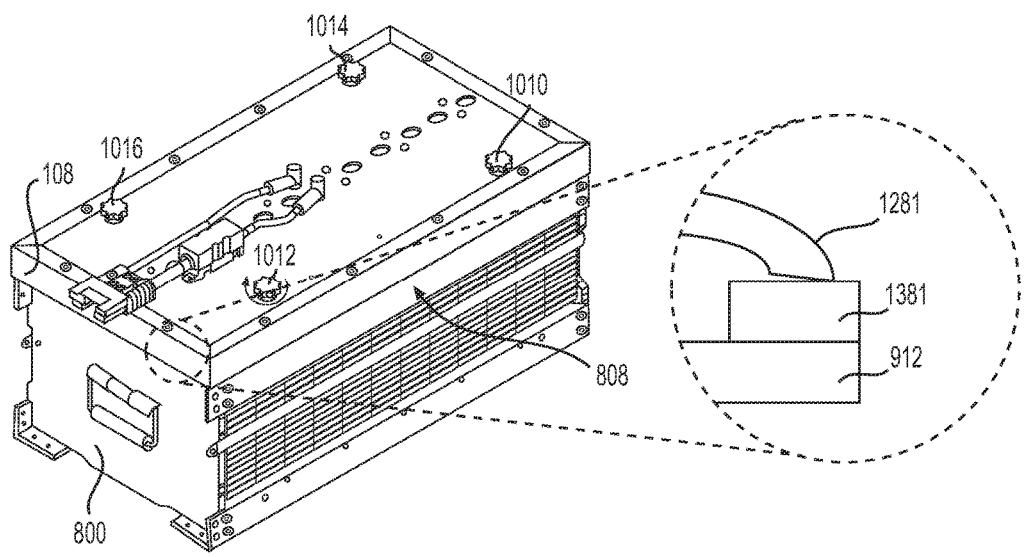
FIG. 15 is a schematic view of contact elements of the rig of FIG. 10 being held in direct contact with bus bars of the battery module of FIG. 8, in accordance with an exemplary embodiment.

In some embodiments, contact elements of a rig may extend away from a bottom surface of a lid of a rig. Referring to FIG. 13, contact elements 1280-1285 may extend away from bottom surface 1308 of lid 1006 of rig 108. In some embodiments, contact elements of a rig may extend away from a bottom surface of a lid of a rig and towards battery cells of a battery module. Referring to FIGS. 14 and 15, contact element 1281 may extend towards battery cell 912. In the example, other contact elements may extend towards battery cell 912 (not shown) and/or other towards other battery cells (not shown).

Figure 16:
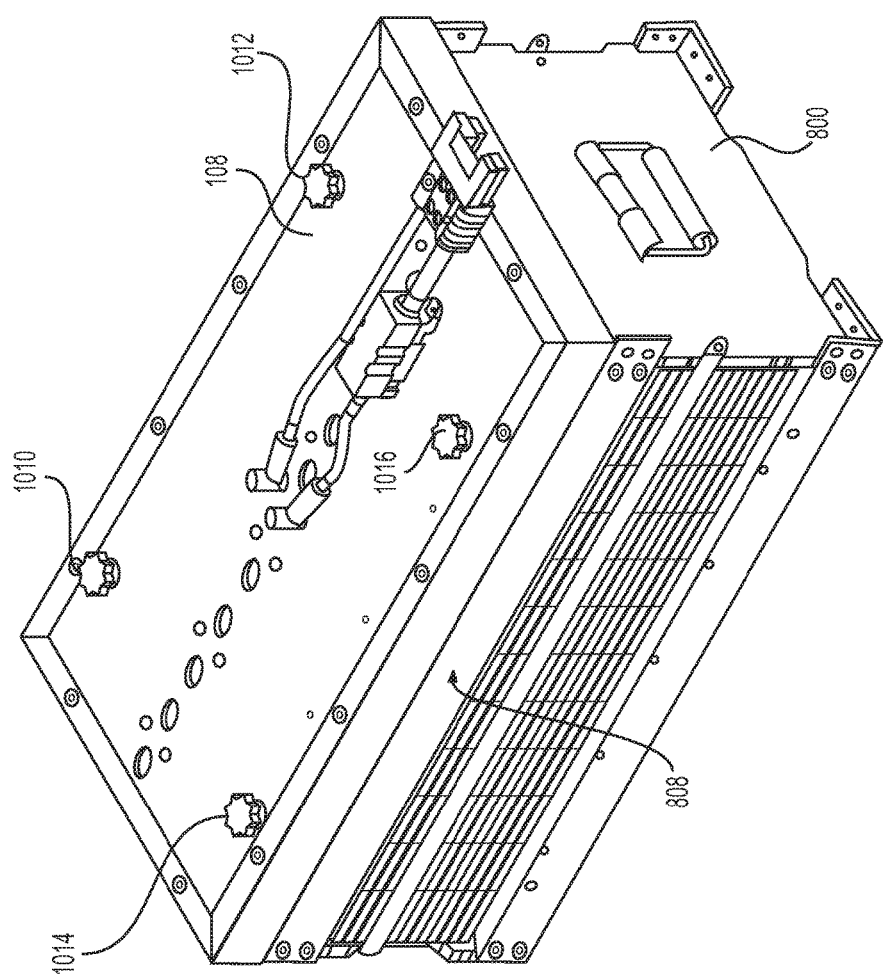
FIG. 16 is a schematic view of the rig of FIG. 10 being disposed onto an enclosure of the battery module of FIG. 8, in accordance with an exemplary embodiment.

In some embodiments the rig may be attached to the battery module. In some embodiments, a human user may attach the rig to an enclosure of a battery module. Referring to FIG. 14, rig 108 may be attached to enclosure 808. In some embodiments, one or more fasteners may be used to attach and/or secure the rig to the battery module. Referring to FIG. 14, a human user may thread hand screws 1010-1016 into enclosure 808. In some embodiments, threading the hand screws may force the rig downward into a cavity of the enclosure of a battery module such that a contact element of the rig may electronically couple with battery cells of a battery module. In other embodiments, the fasteners may be a bolt (not shown), pin, clamp, and the like. Referring to FIGS. 14-16, threading of hand screws 1010-1016 may move rig 108 into cavity 902 (see FIG. 9) of enclosure 808. In the example, such a threading moves contact element 1281 into direct contact with first cathode 1381 of battery cell 912.

Figure 17:
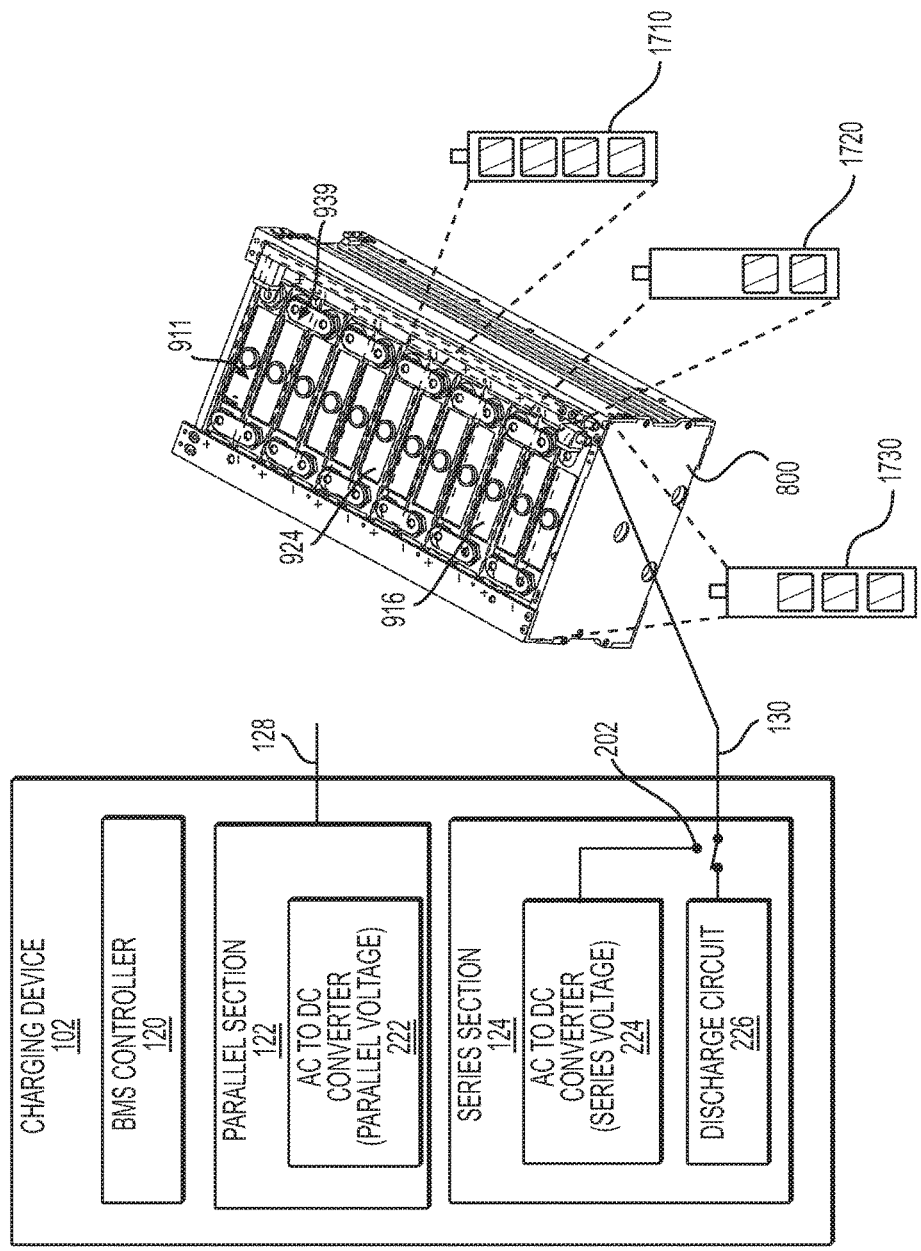
FIG. 17 is a schematic view of a module maintenance system having the battery module in a series configuration, in which a charging device is in a discharging state to discharge the battery module of FIG. 8, in accordance with an exemplary embodiment.

In some instances the battery module may be in a series configuration to facilitate bulk maintenance (e.g., charging and/or discharging) of battery cells of the battery module. Referring to FIG. 17, in the series configuration shown, set of bus bars 939 (e.g., bus bars 940-964 of FIG. 9) electronically couple set of battery cells 911 (e.g., battery cells 912-934 of FIG. 9) in series with bulk output 130. In the example, charging device 102 outputs a second voltage (e.g., 40 volts) to bulk output 130 to change a charge level of set of battery cells 911. In other embodiments, the battery module may be in a parallel configuration (see FIGS. 21-22).

In some embodiments, charging device 102 may selectively switch between a charging state and a discharging state. In some embodiments, the controller may selectively switch between the charging and discharging states using a switch (e.g., transistor, electromagnetic relay, etc.). As shown in FIG. 17, switch 202 may be a single pole change over switch. In other embodiments, other types of switches (e.g., double pole change over) may be used. In the example, in the series configuration of the battery module, controller 120 may cause switch 202 to electronically couple discharge circuit 226 to the bulk output 130 for bulk discharging one or more battery cells of set of battery cells 911. Alternatively, in the series configuration of the battery module, controller 120 may cause switch 202 electronically couple converter 224 to the bulk output 130 for bulk charging one or more of set of battery cells 911 (see FIGS. 19-20).

Figure 18:
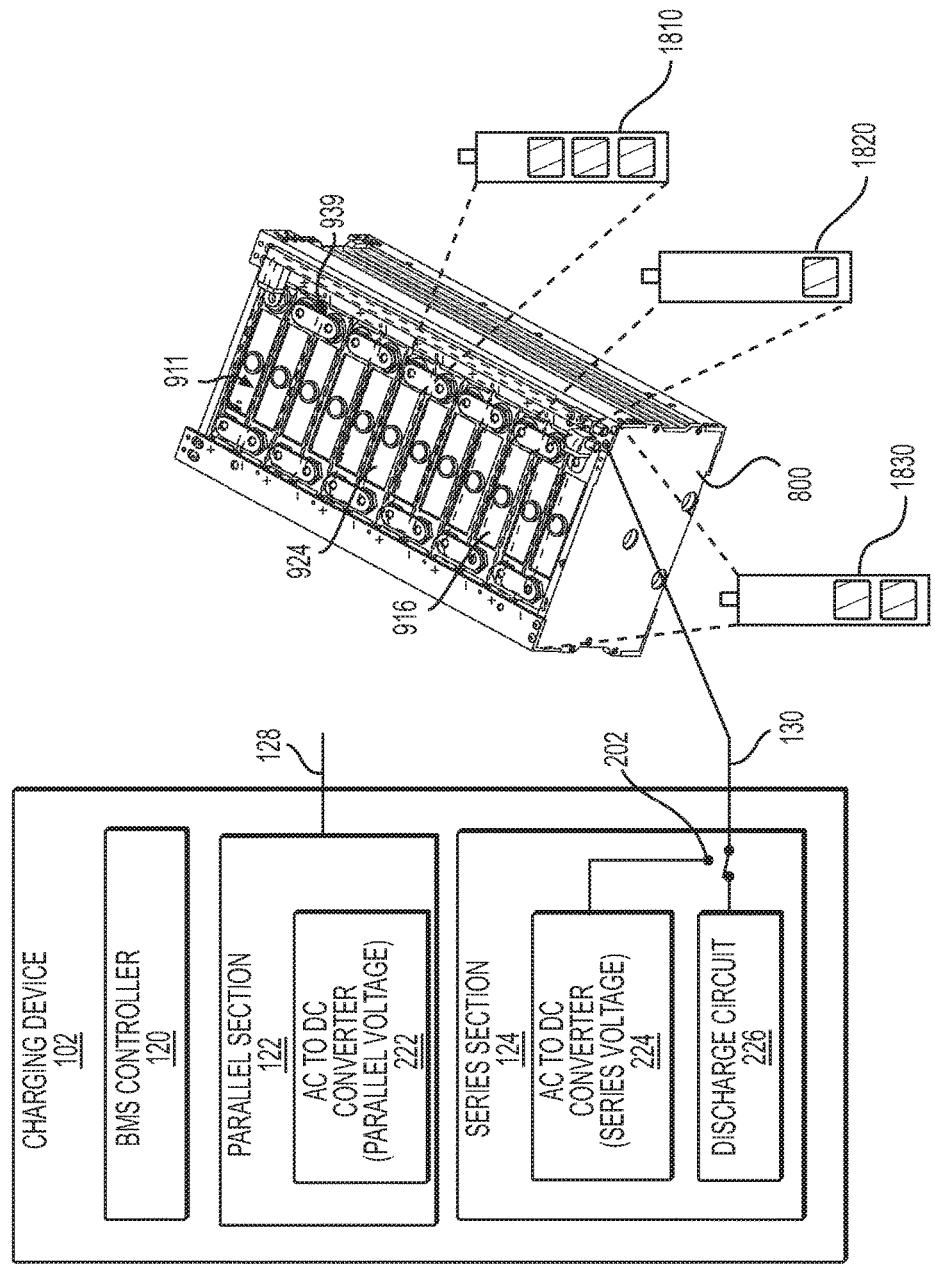
FIG. 18 is a schematic view of a module maintenance system after discharging the battery module of FIG. 8, in accordance with an exemplary embodiment.

In some embodiments, in the discharging state, a charge level of one or more battery cells of a battery module may be reduced. Referring to FIG. 17, set of battery cells 911 of battery module 800 may have initial combined charge level 1730 of about seventy-five percent of a maximum charge level of battery module 800, battery cell 916 may have initial charge level 1720 of about fifty percent of a maximum charge level of battery cell 916, and battery cell 924 may have initial charge level 1710 of about one-hundred percent of a maximum charge level of battery cell 924. In the example, as shown in FIG. 18, discharge circuit 226 may discharge set of battery cells 911 such that battery module 800 may have charge level 1830 of about fifty percent of a maximum charge level of battery cell 912, battery cell 916 may have charge level 1820 of about twenty percent of a maximum charge level of battery cell 916, and battery cell 924 may have charge level 1810 of about seventy-five percent a maximum charge level of battery cell 924. It should be understood that, in some embodiments, in the discharging state, the charging device may transfer energy from the battery module to an electric grid connection to permit line regeneration. For example, charging device 102 may transfer energy from battery module 800 to AC supply 110 (see FIG. 1) using a bi-direction ac-dc converter (e.g., 224).

Figure 19:
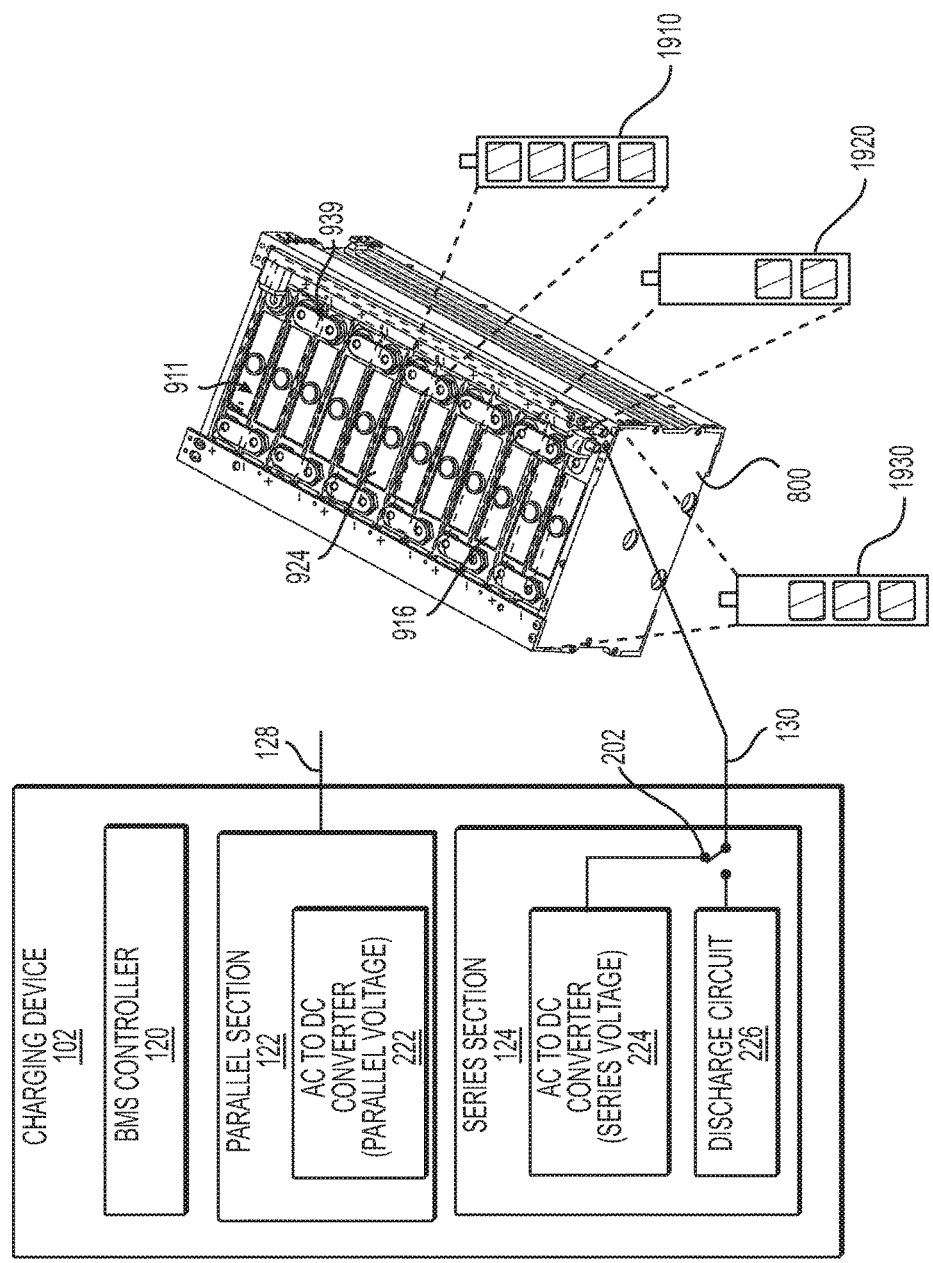
FIG. 19 is a schematic view of a module maintenance system having the battery module in a series configuration, in which a charging device is in a charging state to bulk charge a series string of battery cells of the battery module of FIG. 8, in accordance with an exemplary embodiment.
Figure 20:
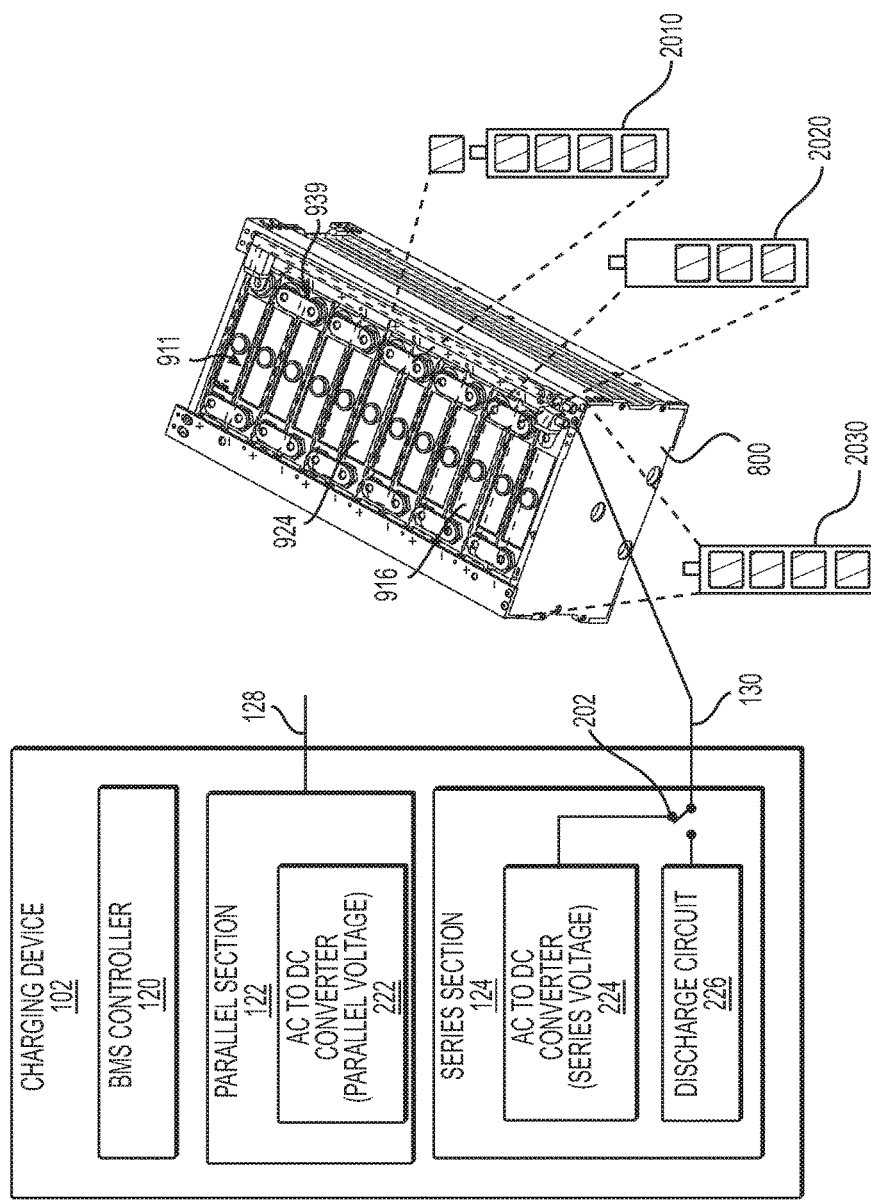
FIG. 20 is a schematic view of a module maintenance system after bulk charging a series string of battery cells of the battery module of FIG. 8, in accordance with an exemplary embodiment.

In some embodiments, in the charging state, a charge level of one or more battery cells of a battery module may be increased. Referring to FIG. 19, set battery cells 911 of battery module 800 may have initial combined charge level 1930 of about seventy-five percent of a maximum charge level of battery module 800, battery cell 916 may have initial charge level 1920 of about fifty percent of a maximum charge level of battery cell 916, and battery cell 924 may have initial charge level 1910 of about one-hundred percent of a maximum charge level of battery cell 924. In the example, as shown in FIG. 20, second converter 224 of charging device 102 may charge set of battery cells 911 such that battery module 800 may have combined charge level 2030 of about one-hundred percent of a maximum charge level of battery module 800, battery cell 916 may have charge level 2020 of about seventy-five percent of a maximum charge level of battery cell 916, and battery cell 924 may have charge level 2010 of about one-hundred-twenty-five (e.g., overcharged) percent a maximum charge level of battery cell 924.

Figure 21:
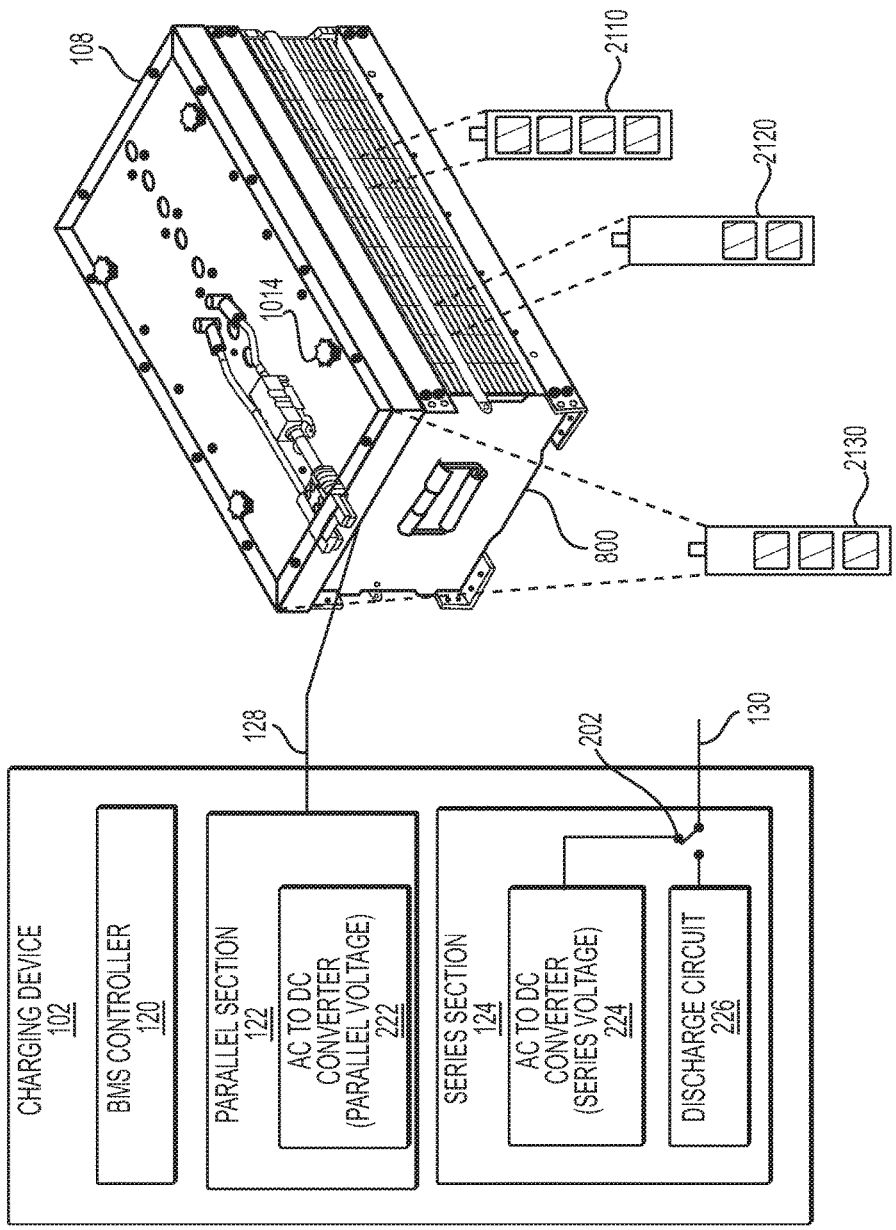
FIG. 21 is a schematic view of a module maintenance system having the battery module in a parallel configuration, in which a charging device uses a rig to charge each battery cell of the battery module of FIG. 8, in accordance with an exemplary embodiment.

In some instances the battery module may be in a parallel configuration to facilitate equalization of battery cells of the battery module. Referring to FIG. 21, in the parallel configuration shown, rig 108 may electronically couple set of battery cells 911 in parallel with equalization output 128. In the example, charging device 102 outputs a second voltage (e.g., 3.3 volts) to equalization output 128 to change a charge level of set of battery cells 911. In other embodiments, the battery module may be in a series configuration (see FIGS. 17-20).

Figure 22:
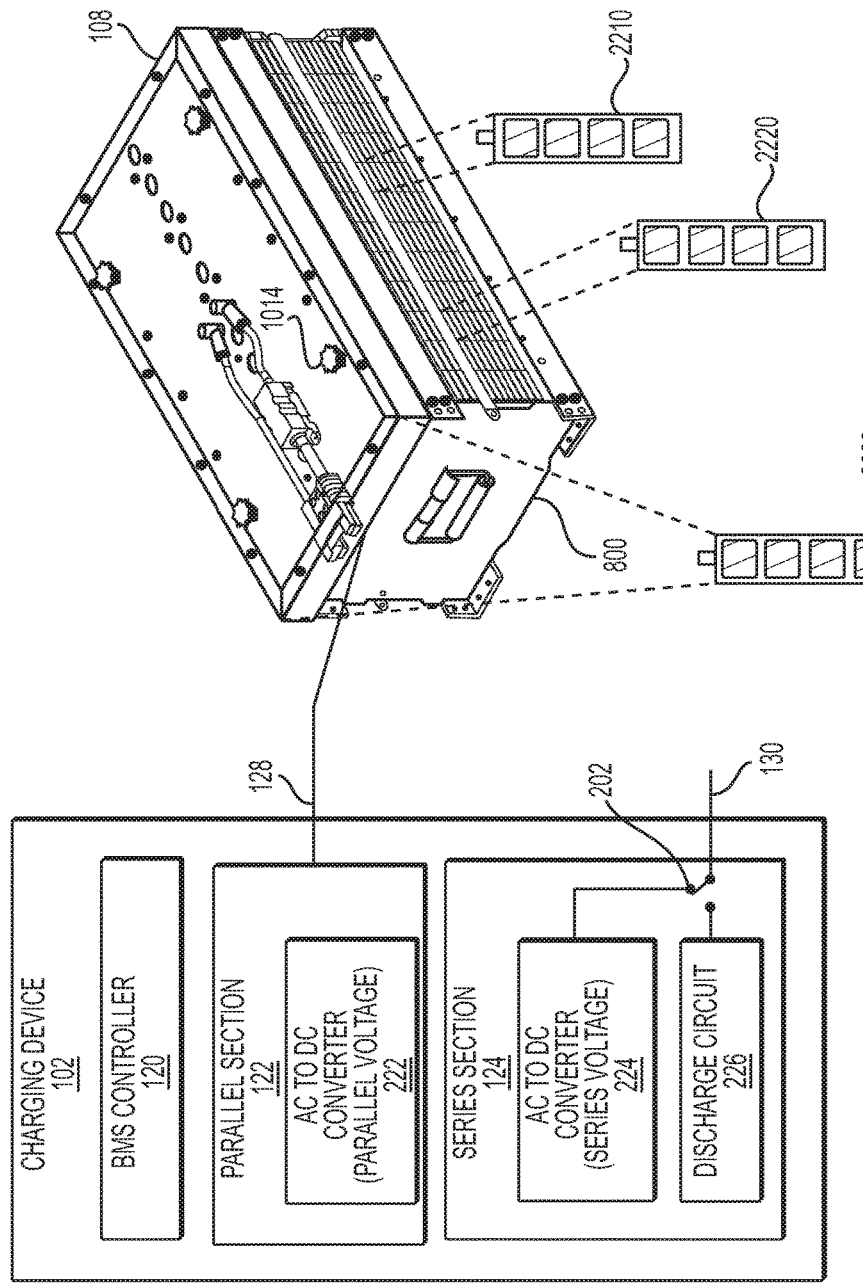
FIG. 22 is a schematic view of a module maintenance system after charging each battery cell of the battery module of FIG. 8, in accordance with an exemplary embodiment.

In some embodiments, in the parallel configuration, a charge level of one or more battery cells of a battery module may be increased. Referring to FIG. 21, set of battery cells 911 of battery module 800 may have initial combined charge level 2130 of about seventy-five percent of a maximum charge level of battery module 800, battery cell 916 may have initial charge level 2120 of about fifty percent of a maximum charge level of battery cell 916, and battery cell 924 may have initial charge level 2110 of about one-hundred percent of a maximum charge level of battery cell 924. In the example, as shown in FIG. 22, first converter 222 of charging device 102 may charge set of battery cells 911 such that battery module 800 may have combined charge level 2230 of about one-hundred percent of a maximum charge level of battery module 800, battery cell 916 may have charge level 2220 of about one-hundred percent of a maximum charge level of battery cell 916, and battery cell 924 may have charge level 2210 of about one-hundred percent a maximum charge level of battery cell 924. That is, the equalization output and rig may be used to equalize or balance charge levels of battery cells of a battery module to reduce overcharging of battery cells and/or to improve an amount of energy stored in a battery module.

It should be understood that, in some embodiments, a charge rate in the parallel configuration may be different than a charge rate in the parallel configuration. For example, charging device 102 may charge battery module 800 in the parallel configuration (see FIGS. 21-22) using a faster charge rate than battery module 800 in the series configuration (see FIGS. 17-20). Further, in some embodiments, a charging device may measure (e.g., using a sensor circuit) and record the different charging rates to detect electrical characteristics of the battery module and/or one or more battery cells of the battery module. For example, local terminal 126 may record such charging rates in data store 150 (see FIG. 1) and/or transmit such charging rates to remote data store 140 using one or more networks 144 (see FIG. 1).

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A module maintenance system comprising:
a battery module comprising an enclosure and at least a first battery cell and a second battery cell, the first and second battery cells being disposed in a cavity of the enclosure;
a rig comprising a lid and a set of buses, the set of buses being attached to the lid;
a charging device for charging the first and second battery cells;
wherein the battery module has a series configuration and a parallel configuration;
wherein, in the series configuration, the lid of the rig is spaced apart from the enclosure and the set of buses of the rig are spaced apart from the first and second battery cells;
wherein, in the series configuration, one or more bus bars couple the first and second battery cells in series and the charging device modifies charge levels of the first and second battery cells using the one or more bus bars; and
wherein, in the parallel configuration, the lid of the rig attaches to the enclosure of the battery module such that the set of buses of the rig couple to the first and second battery cells and the charging device modifies charge levels of the first and second battery cells using the set of buses.

2. The module maintenance system according to claim 1, wherein the charging device includes an equalization output having a first connector and a second connector;
wherein the set of buses of the rig comprises a first bus and a second bus;
wherein the first battery cell has a first anode and a first cathode and the second battery cell has a second anode and a second cathode; and
wherein, in the parallel configuration, the first bus couples the first connector of the equalization output, the first cathode, and the second cathode and wherein, in the parallel configuration, the second bus couples the second connector of the equalization output to the first anode and the second anode.

3. The module maintenance system according to claim 2, wherein the charging device includes a bulk output having a first connector and a second connector;
wherein the one or more bus bars comprises at least a first bus bar; and
wherein, in the series configuration, the first bus bar couples the first anode and the second cathode, the first cathode being coupled to the first connector of the bulk output, and the second anode being coupled to the second connector of the bulk output.

4. The module maintenance system according to claim 3, wherein the first bus comprises a first set of contact elements extending away from a bottom surface of the lid of the rig and the second bus comprises a second set of contact elements extending away from the bottom surface of the lid of the rig;
wherein, in the parallel configuration, a first cathode contact element of the first set of contact elements is coupled to the first cathode and a second cathode contact element of the first set of contact elements is coupled to the second cathode; and
wherein, in the parallel configuration, a first anode contact element of the second set of contact elements is coupled to the first anode and a second anode contact element of the second set of contact elements is coupled to the second anode.

5. The module maintenance system according to claim 4, wherein, in the parallel configuration, the charging device outputs a first voltage on the equalization output;
wherein, in the series configuration, the charging device outputs a second voltage on the bulk output; and
wherein the second voltage is greater than the first voltage.

6. The module maintenance system according to claim 1, wherein the lid of the rig comprises a top surface, the bottom surface and the top surface being on opposite sides of the lid;
wherein the rig comprises a hand screw disposed on the top surface of the lid; and
wherein the hand screw secures the lid of the rig to the enclosure of the battery module.

7. A module maintenance system comprising:
a battery module comprising at least a first battery cell and a second battery cell;
a rig comprising a set of buses for connecting with the first and second battery cells;
a charging device comprising a bulk output and an equalization output;
wherein the battery module has a series configuration and a parallel configuration;
wherein, in the parallel configuration, the rig is disposed onto the battery module such that the set of buses couple the first and second battery cells in parallel;
wherein, in the parallel configuration, the equalization output is coupled to the set of buses and the charging device outputs a first voltage to the equalization output to equalize charge levels of the first and second battery cells;

wherein, in the series configuration, one or more bus bars couple the first and second battery cells in series with the bulk output and the charging device outputs a second voltage to the bulk output to modify charge levels of the first and second battery cells; and wherein the second voltage is greater than the first voltage.

8. The module maintenance system according to claim 7, wherein, in the series configuration, the charging device is configured to selectively switch between a charging state and a discharging state;

wherein, in the charging state of the charging device, the charging device outputs the second voltage on the bulk output; and wherein, in the discharging state of the charging device, the charging device switches a discharging circuit to the bulk output for discharging the first battery, the second battery cell, or a combination thereof.

9. The module maintenance system according to claim 8, wherein the discharge circuit includes a resistive element; and wherein, in the discharging state of the charging device, the charging device switches the resistive element in series with the first and second battery cells.

10. The module maintenance system according to claim 8, wherein, in the discharging state of the charging device, the charging device transfers energy from the first and second battery cells to an electric grid connection.

11. The module maintenance system according to claim 8, wherein, in the series configuration of the battery module, the set of buses of the rig are electronically isolated from the first and second battery cells.

12. The module maintenance system according to claim 8, wherein, in the discharging state of the charging device, the charging device measures a discharge rate of the first battery cell;

wherein, in the charging state of the charging device, the charging device measures a first charge rate of the first battery cell; and wherein, in the parallel configuration, the charging device measures a second charge rate of the first battery cell.

13. The module maintenance system according to claim 12, wherein the charging device includes a computing device, the computing device including a data store; and wherein the computing device stores the discharge rate, the first charge rate, and the second charge rate in the data store.

14. The module maintenance system according to claim 13, wherein the charging device transmits the discharge rate, the first charge rate, and the second charge rate to a remote data store using one or more networks.

15. A module maintenance system comprising:

a battery module comprising an enclosure and at least a first battery cell and a second battery cell, the first and second battery cells being disposed in a cavity of the enclosure;

wherein the first battery cell comprises a first anode and a first cathode and the second battery cell comprises a second anode and a second cathode;

a rig comprising a lid, a first bus having a first set of contact elements, and a second bus having a second set of contact elements; and wherein the lid is secured onto the cavity such that the first set of contact elements are coupled to the first cathode and the second cathode and wherein the lid is secured onto the cavity such that the second set of contact elements are coupled to the first anode and the second anode.

16. The module maintenance system according to claim 15, wherein the first and second battery cells are secured in the cavity; and whereon the first anode is spaced is closer to the second cathode than the second anode and wherein the first cathode is spaced closer to the second anode than the second cathode.

17. The module maintenance system according to claim 16, wherein the battery module comprises a third battery cell having a third anode and a third cathode;

wherein the third battery cell is secured in the cavity;

wherein the second battery cell is disposed in the cavity between the first battery cell and the third battery cell; and wherein the third anode is spaced closer to the second cathode than the second anode and the third cathode is spaced closer to the second anode than the second cathode.

18. The module maintenance system according to claim 17, wherein the first cathode, second anode, and third cathode are aligned along a first axis;

wherein the first anode, second cathode, and third anode are aligned along the first axis; and wherein the first anode and first cathode are aligned along a second axis, the first axis and the second axis being perpendicular.

19. The module maintenance system according to claim 18, wherein an elongated portion of the first bus bar and an elongated portion of the second bus bar extend along the first axis; and wherein the first set of contacts and the second set of contacts extend along the second axis.

20. The module maintenance system according to claim 19, wherein the rig further comprises an insulating layer separating the first bus and the second bus; and wherein the first bus, insulating layer, and second bus are stacked along a third axis, the third axis being perpendicular to the first and second axes.

* * * * *